United States Patent
Shimizu et al.

(10) Patent No.: US 11,445,427 B2
(45) Date of Patent: Sep. 13, 2022

(54) COMMUNICATION DEVICE, COMMUNICATION SYSTEM, CONNECTION DESTINATION CONTROL METHOD, AND TRANSMISSION RATE CONTROL METHOD

(71) Applicant: PANASONIC CORPORATION, Osaka (JP)

(72) Inventors: Noriyuki Shimizu, Kanagawa (JP); Hiroaki Asano, Kanagawa (JP); Hideki Shingu, Tokyo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 40 days.

(21) Appl. No.: 17/220,315

(22) Filed: Apr. 1, 2021

(65) Prior Publication Data
US 2021/0227443 A1 Jul. 22, 2021

Related U.S. Application Data

(62) Division of application No. 16/631,730, filed as application No. PCT/JP2018/021763 on Jun. 6, 2018, now Pat. No. 10,999,775.

(30) Foreign Application Priority Data

Jul. 18, 2017 (JP) .............................. JP2017-139202

(51) Int. Cl.
  *H04W 4/00* (2018.01)
  *H04W 36/32* (2009.01)
  (Continued)

(52) U.S. Cl.
  CPC ........... *H04W 36/32* (2013.01); *H04W 4/029* (2018.02); *H04W 16/28* (2013.01); *H04W 36/02* (2013.01);
  (Continued)

(58) Field of Classification Search
  CPC ..... H04W 36/32; H04W 4/029; H04W 16/28; H04W 36/02; H04W 36/245;
  (Continued)

(56) References Cited

U.S. PATENT DOCUMENTS 6,615,048 B1 * 9/2003 Hayashi ................ H04W 48/02
  455/88
8,188,922 B2 * 5/2012 Kuroshita ................ G01S 5/02
  342/463

(Continued)

FOREIGN PATENT DOCUMENTS

JP  2004-180204  6/2004
JP  2006-217095  8/2006
(Continued)

OTHER PUBLICATIONS

Japanese Office Action dated May 17, 2022 issued in Japanese patent application No. 2021-120350 with corresponding English translation.

(Continued)

*Primary Examiner* — Amancio Gonzalez
(74) *Attorney, Agent, or Firm* — Greenblum & Bernstein, P.L.C.

(57) ABSTRACT

A communication device includes a wireless communication device, a location information acquisition device, a storage and a controller. The wireless communication device wirelessly communicates with a base station used as a connection destination. The location information acquisition device acquires location information on a location of the communication device. The storage stores historical communication information on past communication status. The controller determines a degree of risk of occurrence of reduction in an amount of available communication bandwidth beyond a tolerance limit based on the historical communication information and the location information. The controller further (Continued)

controls a transmission rate for communicating the data based on a result of determination of the degree of risk.

7 Claims, 20 Drawing Sheets

(51) Int. Cl.
*H04W 4/029* (2018.01)
*H04W 16/28* (2009.01)
*H04W 36/02* (2009.01)
*H04W 36/24* (2009.01)
*H04W 36/30* (2009.01)
*H04W 64/00* (2009.01)
*H04W 88/08* (2009.01)

(52) U.S. Cl.
CPC ......... *H04W 36/245* (2013.01); *H04W 36/30* (2013.01); *H04W 64/003* (2013.01); *H04W 88/08* (2013.01)

(58) Field of Classification Search
CPC ... H04W 36/30; H04W 64/003; H04W 88/08; H04W 16/18; H04W 4/02; H04W 36/0083; H04W 36/00835; H04W 36/24; H04W 36/36; H04B 7/06; H04M 11/00
USPC ........................................................ 370/329
See application file for complete search history.

(56) References Cited

U.S. PATENT DOCUMENTS

| | | | | |
|---|---|---|---|---|
| 8,493,944 B2* | 7/2013 | Suzuki | ................. | H04W 64/00 370/328 |
| 8,577,372 B2* | 11/2013 | Inumaru | ............... | H04W 36/32 455/436 |
| 9,066,324 B2* | 6/2015 | Kwon | ................... | H04W 76/14 |
| 9,369,831 B2* | 6/2016 | Nitta | ................... | H04L 41/0654 |
| 10,057,874 B2* | 8/2018 | Terao | ................... | H04W 48/20 |
| 10,530,693 B2* | 1/2020 | Xu | ........................ | H04L 47/12 |
| 10,667,196 B2* | 5/2020 | Kusano | ................ | H04W 36/08 |
| 10,986,553 B2* | 4/2021 | Yoshino | ............... | H04W 4/029 |
| 10,986,635 B2* | 4/2021 | Kato | .................... | H04W 64/00 |
| 10,999,775 B2* | 5/2021 | Shimizu | ............... | H04W 36/02 |
| 2002/0105932 A1* | 8/2002 | Miya | .................... | H04W 16/14 370/349 |
| 2004/0152472 A1* | 8/2004 | Ono | ........................ | H04W 4/02 455/457 |
| 2008/0166971 A1* | 7/2008 | Yashiro | ................. | H04W 28/22 455/66.1 |
| 2013/0267228 A1* | 10/2013 | Yanagida | ............... | G01S 19/12 455/435.1 |
| 2015/0282182 A1* | 10/2015 | Oyama | ............ | H04W 72/0453 370/329 |
| 2016/0127754 A1 | 5/2016 | Lee et al. | | |

FOREIGN PATENT DOCUMENTS

| | | |
|---|---|---|
| JP | 2009-246874 | 10/2009 |
| JP | 2013-236347 | 11/2013 |
| JP | 2014-090376 | 5/2014 |
| JP | 2015-211237 | 11/2015 |
| JP | 2017-028450 | 2/2017 |
| WO | 2006/095866 | 9/2006 |
| WO | 2014/102891 | 7/2014 |

OTHER PUBLICATIONS

International Search Report issued in International Pat. Appl. No. PCT/JP2018/021763, dated Aug. 28, 2018.

* cited by examiner

Fig.5 historical obstruction information registered in communication history database

| date | time | location | RAT | freq | cell ID | beam ID | moving direction | comm quality | rate of comm quality change | greatest comm quality diff btw curr loc – nearby locs | RLF det result |
|---|---|---|---|---|---|---|---|---|---|---|---|
| 2017/3/3 | 14:00:00 | (X1, Y1, Z1) | NR | 28GHz | 1 | 5 | 15° | 0dB | −5dB/s | 5dB | No |
| 2017/3/3 | 14:00:40 | (X2, Y2, Z3) | NR | 40GHz | 5 | 4 | 15° | 10dB | −15dB/s | 5dB | No |
| 2017/3/3 | 14:00:50 | (X1, Y1, Z3) | NR | 40GHz | 5 | 6 | 15° | 7dB | −7dB/s | 35dB | No |
| 2017/3/3 | 14:01 | (X2, Y2, Z4) | NR | 40GHz | 5.0 | 7 | 15° | – | – | – | Yes |
| ... | ... | ... | ... | ... | ... | ... | ... | ... | ... | ... | ... | historical communication information registered in communication history database

| date | time | location | RAT | freq | cell ID | beam ID | moving direction | comm quality | rate of comm quality change |
|---|---|---|---|---|---|---|---|---|---|
| 2017/3/4 | 14:01:00 | (X2, Y2, Z4) | LTE | 2GHz | 12 | - | 15° | 23dB | 3dB |
| 2017/3/4 | 14:01:20 | (X2, Y3, Z4) | LTE | 2GHz | 12 | - | 15° | 20dB | 0dB/s |
| 2017/3/5 | 14:01:30 | (X4, Y4, Z4) | NR | 28GHz | 11 | 55 | 15° | 20dB | 0dB/s |
| 2017/3/5 | 14:01:40 | (X4, Y4, Z4) | NR | 28GHz | 11 | 55 | 15° | 3dB | -17dB |
| 2017/3/5 | 14:01:41 | (X4, Y4, Z5) | NR | 28GHz | 11 | 55 | 15° | 3dB | 0dB/s |
| 2017/3/5 | 14:01:42 | (X4, Y4, Z5) | NR | 28GHz | 11 | 55 | 15° | 3dB | 0dB/s |
| 2017/3/5 | 14:01:43 | (X4, Y4, Z5) | NR | 28GHz | 11 | 55 | 15° | 3dB | 0dB/s |
| 2017/3/5 | 14:01:44 | (X4, Y4, Z5) | NR | 28GHz | 11 | 55 | 15° | 3dB | 0dB/s |
| ... | ... | ... | ... | ... | ... | ... | ... | ... | ... |

| moving direction | comm quality | rate of comm quality change | greatest comm quality diff btw curr loc - nearby locs | RLF det result | app info | trans rate | # of packet loss | RTT |
|---|---|---|---|---|---|---|---|---|
| 15° | 23dB | 3dB/s | 0dB/s | No | video | 3Mbps | 0 | 50 |
| 15° | 20dB | 0dB/s | 2dB/s | No | video | 4Mbps | 0 | 50 |
| 15° | 20dB | 0dB/s | 2dB/s | No | video | 80Mbps | 0 | 50 |
| 15° | 3dB | -17dB/s | 15dB/s | No | video | 5Mbps | 20 | 100 ← not use |
| 15° | 3dB | 0dB/s | 0dB/s | No | video | 6Mbps | 0 | 50 ← use |
| 15° | 3dB | 0dB/s | 0dB/s | No | video | 5Mbps | 0 | 50 |
| 15° | 3dB | 0dB/s | 0dB/s | No | video | 5Mbps | 0 | 50 |
| 15° | 3dB | 0dB/s | 0dB/s | No | video | 5Mbps | 0 | 50 |
| ... | ... | ... | ... | ... | ... | ... | ... | ... |

*Fig. 16*

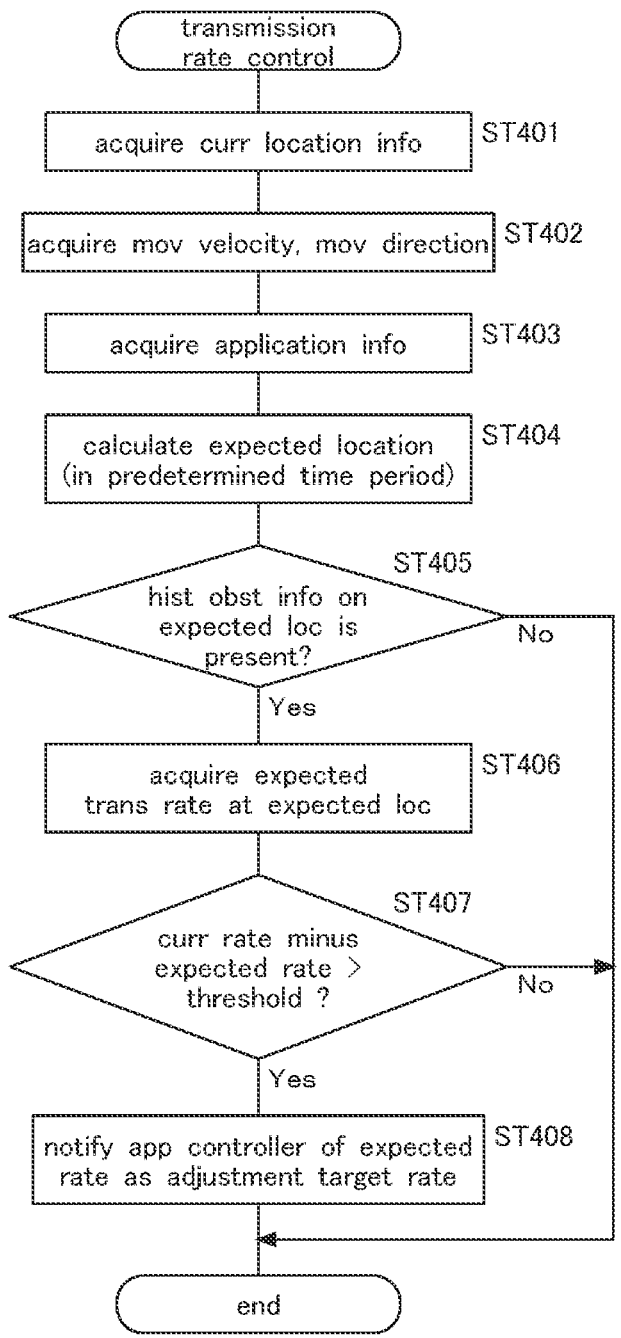

Fig.19 transmission rate table

| connection desitnation | transmission rate |
|---|---|
| LTE | 5Mbps |
| 802.11ac | 20Mbps |
| 802.11n | 10Mbps |

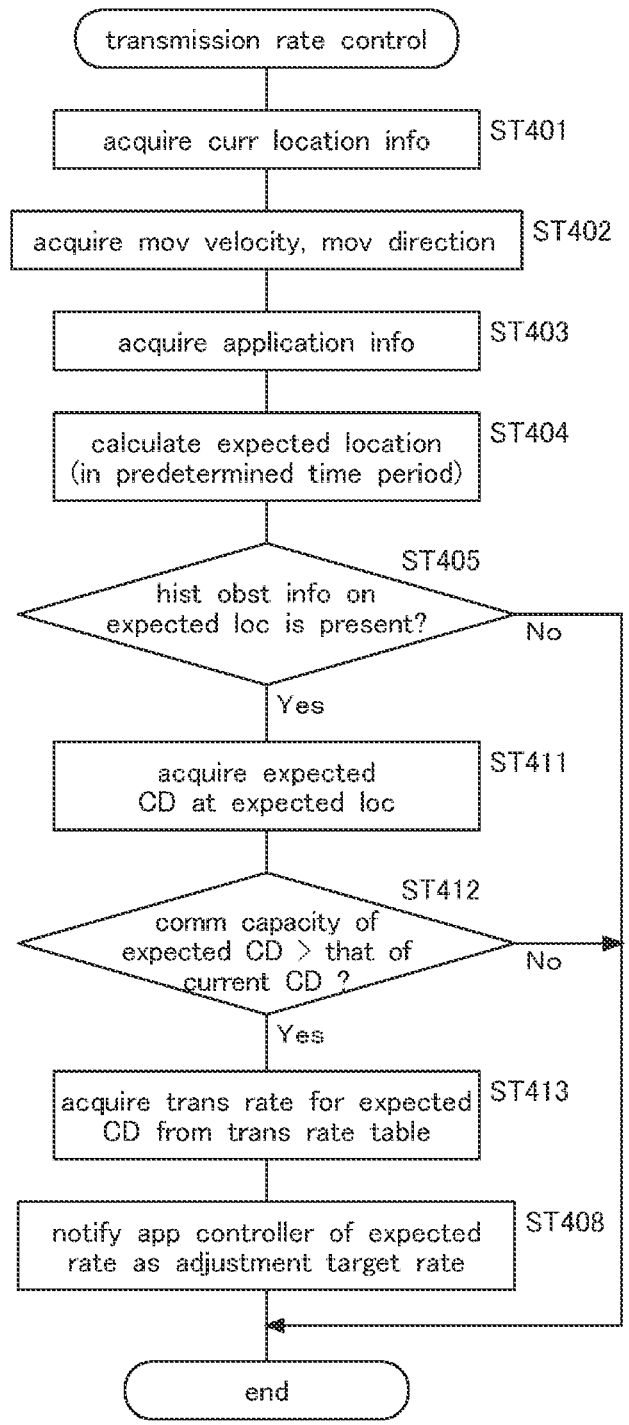

COMMUNICATION DEVICE, COMMUNICATION SYSTEM, CONNECTION DESTINATION CONTROL METHOD, AND TRANSMISSION RATE CONTROL METHOD

CROSS-REFERENCE TO RELATED APPLICATIONS

This application is a Divisional of U.S. patent application Ser. No. 16/631,730, filed on Jan. 16, 2020, which is a U.S. National Phase under 35 U.S.C. § 371 of International Application No. PCT/JP2018/021763, filed on Jun. 6, 2018, which in turn claims the benefit of Japanese Application No. 2017-139202, filed on Jul. 18, 2017. The disclosure of each of these documents, including the specification, drawings, and claims, is incorporated herein by reference in its entirety.

TECHNICAL FIELD

The present invention relates to a communication device for communicating data via a base station used as a connection destination, a communication system in which a communication device communicates data via a base station used as a connection destination, a connection destination control method for controlling a connection destination for a communication device to communicate data via a base station used as the connection destination, and a transmission rate control method for controlling a transmission rate at which a communication device communicates data via a base station used as a connection destination.

BACKGROUND ART

Presently, 5G systems (Fifth generation mobile communication systems) are being considered for introduction into general use in wireless communications. 5G wireless communication systems enable communications at high transmission capacities of more than 10 Gbps by utilizing high frequency bands such as high SHF band and EHF band. Such high frequency bands have not been used for mobile radio communications so far and thus allow wider available communication bandwidths to be secured for use in communications. Such communication schemes utilizing high frequency bands can provide communications at high transmission capacities, but involve a problem of decrease in communication quality when an obstacle is located on a communication path, which problem is caused due to the fact that higher-frequency electromagnetic waves tend to travel in straight lines.

Meanwhile, in recent years, because of increasing amounts of video data shot by mobile devices (such as smartphone and tablet) and uploaded to servers or those downloaded from servers to such mobile devices for viewing, what is called "mobile video traffic" for transmitting large amounts of video data through mobile communications is expanding. Accordingly, there is an increasing need for 5G systems using high frequency bands and supporting high capacity communications which are expected to be capable of accommodating such large amounts of video data.

However, when using high capacity communications at high frequency bands, users are likely to encounter significant reduction in QoE (Quality of Experience) because, as described above, decrease in communication quality by obstruction is likely to occur, which can cause a choppy picture when communicating video data in the form of a real time video stream or in other forms for displaying and viewing.

Thus, one possible solution is to perform communication in such a manner as to avoid an obstructed area(s) where decrease in communication quality occurs due to obstruction. Known technical ideas related to the avoidance of a specific area(s) include one in which a communication device is configured to have a pre-defined obstructed area(s) in which each communication device is disabled to perform wireless communication at a corresponding specific frequency, and when the device enters its obstructed area, the device changes the frequency used for communication to a different one as appropriate. (See Patent Document 1)

PRIOR ART DOCUMENT(S)

Patent Document(S)

Patent Document 1: WO2014/102891A

SUMMARY OF THE INVENTION

Task to be Accomplished by the Invention

As the above-described technology of the prior art, a communication device configured to perform wireless communication in such a manner as to avoid a specific area(s); that is, an obstructed area(s) in which decrease in communication quality occurs by obstruction, can prospectively avoid decrease in communication quality, thereby preventing significant reduction in QoE due to a choppy picture of the viewed streaming video. However, there are various types of obstacles such as road signs, traffic lights, trees, and signboards and the state of each obstacle can change with time. Thus, to precisely pre-define an obstructed area(s) is of great difficulty in reality. Accordingly, the problem of inability to prospectively avoid decrease in communication quality by obstruction remains unresolved.

Moreover, the amount of available communication bandwidth can significantly vary depending on different connection destinations. Thus, when a change in the connection destination causes rapid decrease in the amount of available communication bandwidth, significant reduction in QoE is likely to occur due to a choppy picture in a similar manner to that of the above-described technology. Thus, them is also need for technology to prospectively avoid rapid reduction in the amount of available communication bandwidth.

The present invention has been made in view of the problem of the prior art, and a primary object of the present invention is to provide a communication device, a communication system, a connection destination control method, and a transmission rate control method which allow for prospective avoidance of decrease in communication quality due to obstruction and/or rapid reduction in an amount of available communication bandwidth, thereby enabling users to avoid experiencing significant reduction in QoE.

Means to Accomplish the Task

An aspect of the present invention provides a communication device for communicating data via a base station used as a connection destination, the communication device comprising: a wireless communication device configured to wirelessly communicate with the base station used as the connection destination; a location information acquisition device configured to acquire location information on a location of the communication device; a storage configured to store historical obstruction information for an obstructed location where decrease in communication quality due to obstruction has occurred before; a controller configured to: determine a degree of risk of occurrence of decrease in communication quality due to obstruction based on the historical obstruction information and the location information, the degree of risk being determined for at least one of a current connection destination that is currently used by the communication device and a future connection destination that is expected to be used by the communication device; and control the connection destination based on a result of determination of the degree of risk.

Another aspect of the present invention provides a communication device for communicating data via a base station used as a connection destination, the communication device comprising: a wireless communication device configured to wirelessly communicate with the base station used as the connection destination; a location information acquisition device configured to acquire location information on a location of the communication device; a storage configured to store historical communication information on past communication status; and a controller configured to: determine a degree of risk of occurrence of reduction in an amount of available communication bandwidth beyond a tolerance limit based on the historical communication information and the location information, the degree of risk being determined for an expected location at which the communication device is expected to be located after a lapse of a predetermined time period; and control a transmission rate for communicating the data based on a result of determination of the degree of risk.

Yet another aspect of the present invention provides a communication system in which a communication device communicates data via a base station used as a connection destination, wherein the communication device comprises: a wireless communication device configured to wirelessly communicate with the base station used as the connection destination; a location information acquisition device configured to acquire location information on a location of the communication device; a storage configured to store historical obstruction information for an obstructed location where decrease in communication quality due to obstruction has occurred before; a controller configured to: determine a degree of risk of occurrence of decrease in communication quality due to obstruction based on the historical obstruction information and the location information, the degree of risk being determined for at least one of a current connection destination that is currently used by the communication device and a future connection destination that is expected to be used by the communication device; and control the connection destination based on a result of determination of the degree of risk.

Yet another aspect of the present invention provides a communication system in which a communication device communicates data via a base station used as a connection destination, wherein the communication device comprises: a wireless communication device configured to wirelessly communicate with the base station used as the connection destination; a location information acquisition device configured to acquire location information on a location of the communication device; a storage configured to store historical communication information on past communication status; and a controller configured to: determine a degree of risk of occurrence of reduction in an amount of available communication bandwidth beyond a tolerance limit based on the historical communication information and the location information, the degree of risk being determined for an expected location at which the communication device is expected to be located after a lapse of a predetermined time period; and control a transmission rate for communicating the data based on a result of determination of the degree of risk.

Yet another aspect of the present invention provides a connection destination control method for controlling a connection destination for a communication device to communicate data via a base station used as the connection destination, the method comprising: the communication device determining a degree of risk of occurrence of decrease in communication quality due to obstruction based on historical obstruction information and location information on a location of the communication device, the historical obstruction information being information on one or more obstructed locations where decrease in communication quality due to obstruction has occurred before, and the degree of risk being determined for at least one of a current connection destination that is currently used by the communication device and a future connection destination that is expected to be used by the communication device; and the communication device controlling the connection destination based on a result of determination of the degree of risk.

Yet another aspect of the present invention provides a transmission rate control method for controlling a transmission rate at which a communication device communicates data via a base station used as a connection destination, the method comprising: the communication device determine a degree of risk of occurrence of reduction in an amount of available communication bandwidth beyond a tolerance limit based on historical communication information on past communication status and location information on a location of the communication device, the degree of risk being determined for an expected location at which the communication device is expected to be located after a lapse of a predetermined time period; and the communication device controlling a transmission rate for communicating the data based on a result of determination of the degree of risk.

Effect of the Invention

According to the present invention, when there is a risk of occurrence of decrease in communication quality due to obstruction, a connection destination is prospectively changed to a different safer connection destination. As a result, a communication device can prospectively avoid decrease in communication quality due to obstruction, thereby enabling users to avoid experiencing significant reduction in QoE. Moreover, when there is a risk of occurrence of rapid reduction in an amount of available communication bandwidth beyond a tolerance limit, a transmission rate is prospectively changed to a safer transmission rate. As a result, a communication device can prospectively avoid rapid reduction in an amount of available communication bandwidth, thereby enabling users to avoid experiencing significant reduction in QoE.

BRIEF DESCRIPTION OF THE DRAWINGS

FIG. 5 is an explanatory view showing an example of historical obstruction information registered in a communication history database according to the first embodiment of the present invention;

FIG. 16 is an explanatory view showing an example of historical communication information registered in a communication history database according to the fourth embodiment of the present invention;

FIG. 17 is a flowchart showing an operation procedure of the user terminal 1 according to the fourth embodiment of the present invention;

FIG. 19 is an explanatory view showing an example of a transmission rate table according to a fifth embodiment of the present invention; and FIG. 20 is a flowchart showing an operation procedure of a user terminal 1 according to the fifth embodiment of the present invention.

DESCRIPTION OF THE PREFERRED EMBODIMENT(S)

Figure 1:
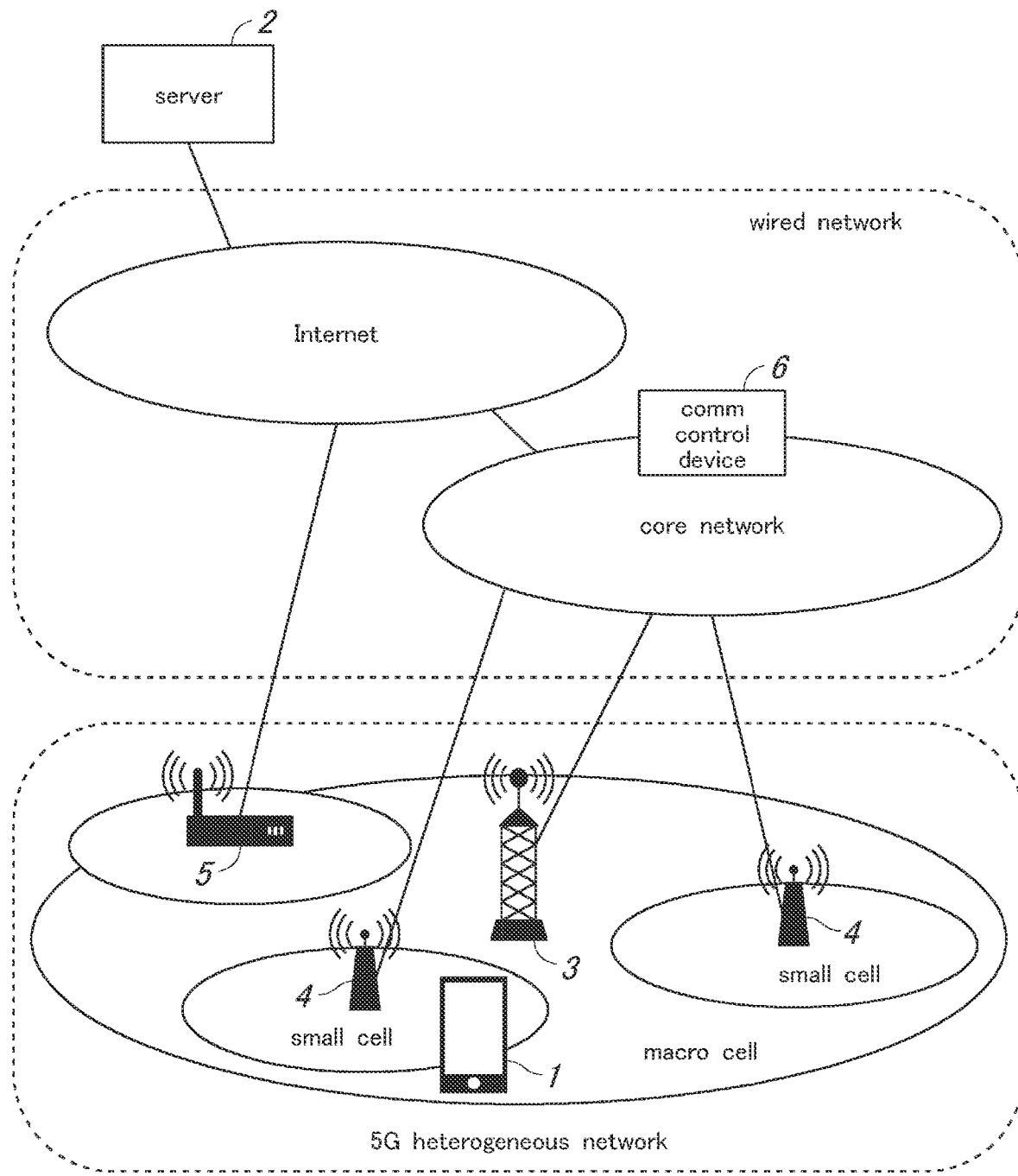
FIG. 1 is a diagram showing a general configuration of a communication system according to a first embodiment of the present invention.

A first aspect of the present invention made to achieve the above-described object is a communication device for communicating data via a base station used as a connection destination, the communication device comprising: a wireless communication device configured to wirelessly communicate with the base station used as the connection destination; a location information acquisition device configured to acquire location information on a location of the communication device; a storage configured to store historical obstruction information for an obstructed location where decrease in communication quality due to obstruction has occurred before; a controller configured to: determine a degree of risk of occurrence of decrease in communication quality due to obstruction based on the historical obstruction information and the location information, the degree of risk being determined for at least one of a current connection destination that is currently used by the communication device and a future connection destination that is expected to be used by the communication device; and control the connection destination based on a result of determination of the degree of risk.

In this configuration, when there is a risk of occurrence of decrease in communication quality due to obstruction, a connection destination is prospectively changed to a different safer connection destination. As a result, a communication device can prospectively avoid decrease in communication quality due to obstruction, thereby enabling users to avoid experiencing significant reduction in QoE.

A second aspect of the present invention is the communication device of the first aspect, wherein the controller is configured to control a cell of the connection destination.

In this configuration, when decrease in communication quality due to obstruction occurs in a specific cell, a connection destination can be changed to a safer cell so as to avoid the specific cell.

A third aspect of the present invention is the communication device of the first aspect, wherein the controller is configured to control a beam of the connection destination.

In this configuration, when decrease in communication quality due to obstruction occurs in a specific beam, a connection destination can be changed to a safer beam so as to avoid the specific beam.

A fourth aspect of the present invention is the communication device of the first aspect, wherein the controller is configured such that, when there is a risk of occurrence of decrease in communication quality due to obstruction associated with the current connection destination, the controller changes the connection destination from the current connection destination to a different connection destination.

In this configuration, since a connection destination is changed from one which involves a risk of occurrence of decrease in communication quality due to obstruction to a safe connection destination, a communication device can prospectively avoid decrease in communication quality due to obstruction.

A fifth aspect of the present invention is the communication device of the first aspect, wherein the controller is configured such that, when there is a risk of occurrence of decrease in communication quality due to obstruction associated with the future connection destination as a connection destination candidate, the controller control the connection destination in such a manner as to avoid selecting the future connection destination as a connection destination.

In this configuration, since, upon a change in a connection destination (handover), a safe connection destination in which decrease in communication quality due to obstruction does not occur is selected as a new connection destination, a communication device can prospectively avoid decrease in communication quality due to obstruction.

A sixth aspect of the present invention is the communication device of the first aspect, wherein the controller is configured to define a risky area around the obstructed location, and to determine the degree of risk based on whether or not the communication device is present in the risky area.

In this configuration, prior to actual occurrence of decrease in communication quality due to obstruction, a degree of risk of occurrence of decrease in communication quality can be precisely determined.

A seventh aspect of the present invention is the communication device of the first aspect, wherein the controller is configured to determine the degree of risk based on an accession time required for the communication device to reach the obstructed location.

In this configuration, prior to actual occurrence of decrease in communication quality due to obstruction, a degree of risk of occurrence of decrease in communication quality can be precisely determined.

An eighth aspect of the present invention is the communication device of the first aspect, wherein the controller is configured to determine the degree of risk based on moving status of the communication device.

In this configuration, a degree of risk of occurrence of decrease in communication quality can be precisely determined by taking moving status of a communication device into consideration.

A ninth aspect of the present invention is the communication device of the first aspect, wherein the controller is configured to determine the degree of risk based on a type of application currently performing communication.

In this configuration, a degree of risk of occurrence of decrease in communication quality can be properly determined so as to meet transmission characteristics required by a type of application currently performing communication.

A tenth aspect of the present invention is the communication device of the first aspect, wherein the controller is configured to determine the degree of risk based on a type of the communication device.

In this configuration, a degree of risk of occurrence of decrease in communication quality can be properly determined so as to meet transmission characteristics required by a type of communication device.

An eleventh aspect of the present invention is a communication device for communicating data via a base station used as a connection destination, the communication device comprising: a wireless communication device configured to wirelessly communicate with the base station used as the connection destination; a location information acquisition device configured to acquire location information on a location of the communication device; a storage configured to store historical communication information on past communication status; and a controller configured to: determine a degree of risk of occurrence of reduction in an amount of available communication bandwidth beyond a tolerance limit based on the historical communication information and the location information, the degree of risk being determined for an expected location at which the communication device is expected to be located after a lapse of a predetermined time period; and control a transmission rate for communicating the data based on a result of determination of the degree of risk.

In this configuration, when there is a risk of occurrence of rapid reduction in an amount of available communication bandwidth beyond a tolerance limit, a transmission rate is prospectively changed to a safer transmission rate. As a result, a communication device can prospectively avoid rapid reduction in an amount of available communication bandwidth, thereby enabling users to avoid experiencing significant reduction in QoE.

A twelfth aspect of the present invention is the communication device of the eleventh aspect, wherein the storage configured to store a transmission rate and application information both for each location as historical communication information, and wherein the controller is configured to, based on the historical communication information, acquire application information on an application currently performing communication and an expected transmission rate at the expected location, and communicates the data at the expected transmission rate.

This configuration enables a communication device to communicate data at a proper transmission rate.

A thirteenth aspect of the present invention is the communication device of the twelfth aspect, wherein the controller is configured to determine that there is a risk of occurrence of decrease in communication quality due to obstruction when the expected transmission rate is lower than a current transmission rate by a rate difference which is greater than a predetermined threshold value.

This configuration enables a communication device to precisely determine a degree of risk of occurrence of rapid reduction in an amount of available communication bandwidth beyond a tolerance limit.

A fourteenth aspect of the present invention is the communication device of the eleventh aspect, wherein the storage configured to store a connection destination for each location as historical communication information, and wherein the controller is configured to, based on the historical communication information, acquire an expected connection destination at the expected location, and communicate the data at a transmission rate for the expected connection destination.

This configuration enables a communication device to communicate data at a proper transmission rate.

A fifteenth aspect of the present invention is the communication device of the fourteenth aspect, wherein the controller is configured to determine that there is a risk of occurrence of decrease in communication quality due to obstruction when a transmission capacity of the expected connection destination at the expected location is lower than that of a current connection destination.

This configuration enables a communication device to precisely determine a degree of risk of occurrence of rapid reduction in an amount of available communication bandwidth beyond a tolerance limit.

A sixteenth aspect of the present invention is a communication system in which a communication device communicates data via a base station used as a connection destination, wherein the communication device comprises: a wireless communication device configured to wirelessly communicate with the base station used as the connection destination; a location information acquisition device configured to acquire location information on a location of the communication device; a storage configured to store historical obstruction information for an obstructed location where decrease in communication quality due to obstruction has occurred before; a controller configured to: determine a degree of risk of occurrence of decrease in communication quality due to obstruction based on the historical obstruction information and the location information, the degree of risk being determined for at least one of a current connection destination that is currently used by the communication device and a future connection destination that is expected to be used by the communication device; and control the connection destination based on a result of determination of the degree of risk.

This configuration enables a communication device to prospectively avoid decrease in communication quality due to obstruction, thereby enabling users to avoid experiencing significant reduction in QoE in the same manner as the first aspect of the present invention.

A seventeenth aspect of the present invention is a communication system in which a communication device communicates data via a base station used as a connection destination, wherein the communication device comprises: a wireless communication device configured to wirelessly communicate with the base station used as the connection destination; a location information acquisition device configured to acquire location information on a location of the communication device; a storage configured to store historical communication information on past communication status; and a controller configured to: determine a degree of risk of occurrence of reduction in an amount of available communication bandwidth beyond a tolerance limit based on the historical communication information and the location information, the degree of risk being determined for an expected location at which the communication device is expected to be located after a lapse of a predetermined time period; and control a transmission rate for communicating the data based on a result of determination of the degree of risk.

This configuration enables a communication device to prospectively avoid rapid reduction in an amount of available communication bandwidth, thereby enabling users to avoid experiencing significant reduction in QoE in the same manner as the eleventh aspect of the present invention.

An eighteenth aspect of the present invention is a connection destination control method for controlling a connection destination for a communication device to communicate data via a base station used as the connection destination, the method comprising: the communication device determining a degree of risk of occurrence of decrease in communication quality due to obstruction based on historical obstruction information and location information on a location of the communication device, the historical obstruction information being information on one or more obstructed locations where decrease in communication quality due to obstruction has occurred before, and the degree of risk being determined for at least one of a current connection destination that is currently used by the communication device and a future connection destination that is expected to be used by the communication device; and the communication device controlling the connection destination based on a result of determination of the degree of risk.

This configuration enables a communication device to prospectively avoid decrease in communication quality due to obstruction, thereby enabling users to avoid experiencing significant reduction in QoE in the same manner as the first aspect of the present invention.

A nineteenth aspect of the present invention is a transmission rate control method for controlling a transmission rate at which a communication device communicates data via a base station used as a connection destination, the method comprising: the communication device determine a degree of risk of occurrence of reduction in an amount of available communication bandwidth beyond a tolerance limit based on historical communication information on past communication status and location information on a location of the communication device, the degree of risk being determined for an expected location at which the communication device is expected to be located after a lapse of a predetermined time period; and the communication device controlling a transmission rate for communicating the data based on a result of determination of the degree of risk.

This configuration enables a communication device to prospectively avoid rapid reduction in an amount of available communication bandwidth, thereby enabling users to avoid experiencing significant reduction in QoE in the same manner as the eleventh aspect of the present invention.

Embodiments of the present invention will be described below with reference to the drawings.

First Embodiment

FIG. 1 is a diagram showing a general configuration of a communication system according to a first embodiment of the present invention.

The communication system includes a user terminal 1 (communication device), a server 2, a macro cell base station 3 (base station device), small cell base stations 4 (base station devices), a wireless LAN base station 5 (access point, base station), and a communication control device 6.

A communication area of the macro cell base station 3 overlaps with those of the small cell base stations 4 and the wireless LAN base station, whereby what is called a heterogeneous network is constructed, in which a communication environment supporting multiple RATs (Radio Access Technologies) is provided.

The user terminal 1 may be a smartphone, a tablet terminal, and any other suitable terminal device. The user terminal 1 is capable of being connected to the base stations 3, 4 and 5, which construct the heterogeneous network. The user terminal 1 communicates with the server 2 via the heterogeneous network, a wired network including the Internet and a core-network.

The server 2 is configured to communicate with the user terminal 1 in order to receive and transmit various data which the user terminal 1 uploads to and downloads from the server 2. For example, the server 2 receives and stores video data shot by the user terminal 1, and also distributes various contents to the user terminal 1.

The macro cell base station 3 performs wireless communication using a UHF band, e.g. wireless communication using LTE (Long Term Evolution) scheme. The macro cell base station 3 is a C-plane cell, which handles control plane (C-Plane) massages for transmitting control signals. In other embodiments, the macro cell base station 3 may be used as a U-Plane cell, which handles user plane (U-Plane) messages for transmitting user data.

The small cell base stations 4 perform wireless communication using a high SHF band or EHF band (millimeter wave band), which can comply with 5G NR (New Radio). The small cell base stations 4 are used as cells handling user plane (U-Plane) messages for transmitting user data.

The wireless LAN access point 5 is configured to perform relatively large capacity wireless communication using a suitable wireless communication scheme such as a WiFi (Registered Trademark) communication system or a WiGig (Registered Trademark) communication system.

The communication control device 6 may be an LTE communication device such as S-GW (Serving Gateway) or P-GW (Packet data network Gateway) for controlling wireless communication using a macro cell base station (LTE), or an NR communication device such as SMF (Session Management Function) device or UPF (User Plane Function) device for controlling wireless communication using a small cell base station (NR).

Next, connection destination (CD) control operations performed by a user terminal 1 according to the first embodiment of the present invention will be described. FIG. 2 is an explanatory view showing an outline of connection destination control operations performed by the user terminal 1.

In cases where an obstacle(s) such as a building exists within a cell, a space hidden behind the obstacle as seen from a base station 3, 4, 5 includes an obstructed area formed therein where decrease in communication quality can occur due to blockage of radius waves by the obstacle. When the user terminal 1 enters the obstructed area, decrease in communication quality can occur due to obstruction, which can cause a choppy picture when displaying and viewing a video stream, resulting in significant reduction in QoE (Quality of Experience).

Meanwhile, there are various types of obstacles other than buildings such as road signs, traffic lights, trees, and signboards. In addition, the state of each obstacle can change with time (e.g. tree felling, removal of signboard, and sparse traffic). Thus, to precisely define an obstructed area(s) based on the state of an obstacle is of great difficulty.

In order to address the above problem, in the present embodiment, a communication device such as the user terminal 1 accumulates historical obstruction information for an obstructed location where decrease in communication quality due to obstruction has occurred before; determining whether or not the user terminal 1 has reached a location close to the obstructed location based on the historical obstruction information and location information on a location of the user terminal 1; determines a degree of risk of occurrence of decrease in communication quality due to obstruction based on a result of the location-related determination; and control a connection destination based on a result of determination of the degree of risk so as not to select a cell corresponding to the obstructed location.

Figure 2A:
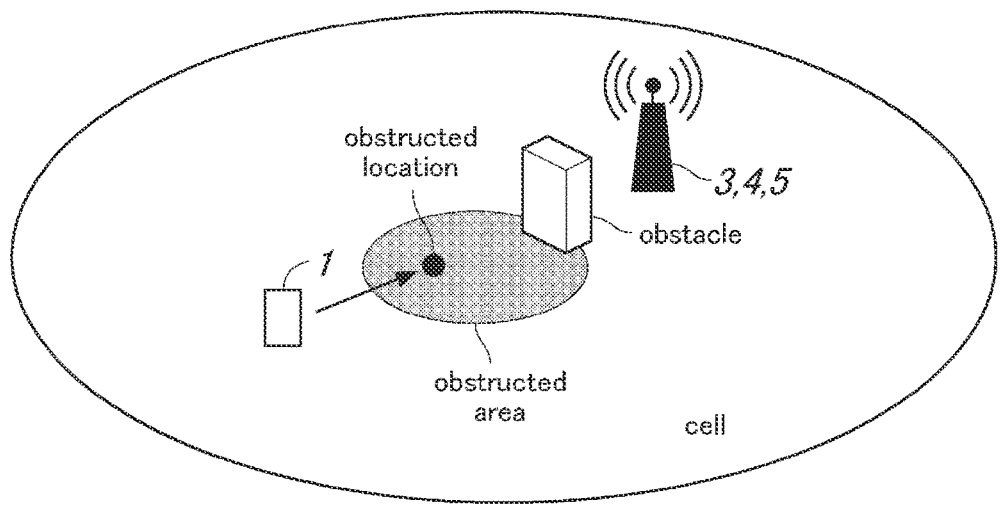
FIGS. 2A and 2B are explanatory views showing an outline of connection destination (CD) control operations performed by a user terminal 1 according to the first embodiment of the present invention.
Figure 2B:
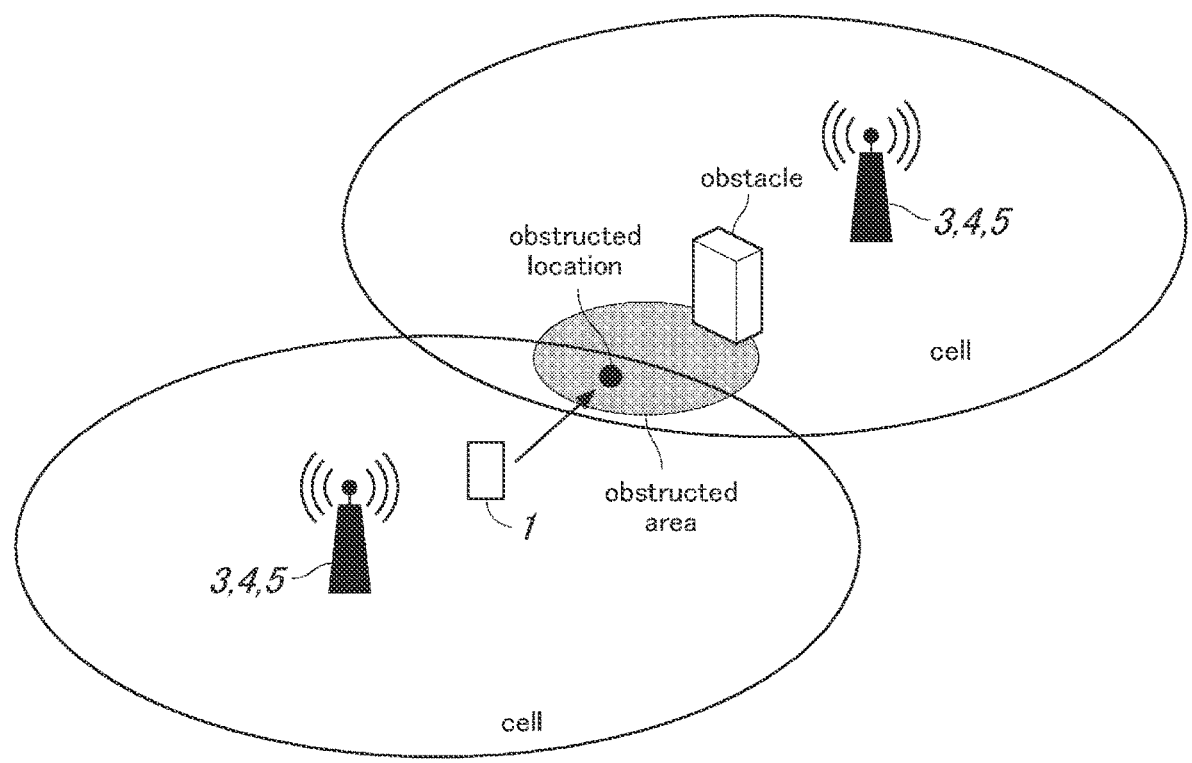

In the present embodiment, the user terminal 1 performs different connection destination control operations depending on which of the following two cases: one is a case where, as shown in FIG. 2A, the user terminal 1 has not reached a boundary of a currently-connected cell and the other is a case where, as shown in FIG. 2B, the user terminal 1 has reached a boundary of a currently-connected cell (the left cell in FIG. 2B).

In the case where the user terminal 1 has not reached a boundary of a currently-connected cell as shown in FIG. 2A, control operations are performed such that the user terminal determines a degree of risk of occurrence of decrease in communication quality associated with a current connection destination (a connection destination currently used by the user terminal) and changes its connection destination as necessary.

Specifically, when the user terminal 1 reaches a location close to the obstructed location, the user terminal temporarily changes its connection destination to a different cell (an alternative cell) from the currently-connected cell. For example, in cases where the currently-connected cell is a small cell providing a large amount of available communication bandwidth, when the user terminal 1 reaches a location close to the obstructed location associated with the small cell providing the large amount of available communication bandwidth, the user terminal temporarily changes its connection destination to the macro cell providing a small amount of available communication bandwidth as an alternative cell. In this case, if the user terminal 1 then moves away from the obstructed location, the user terminal changes its connection destination back to the small cell.

In the case where the user terminal 1 has reached a boundary of a currently-connected cell as shown in FIG. 2B, control operations am performed such that the user terminal determines one or more degrees of risk of occurrence of decrease in communication quality associated with one or more nearby connection destinations; that is, one or more connection destination candidates (adjacent cells) in order to select a future connection destination from the candidates to thereby carry out a change in its connection destination (handover) as appropriate.

Specifically, when the user terminal 1 reaches a location close to an obstructed location associated with one of the connection destination candidates, the user terminal controls its connection destination so as to exclude a cell corresponding to the obstructed location from connection destination candidates. For example, even in cases where connection destination candidates include a small cell providing a large amount of available communication bandwidth, when the user terminal 1 reaches a location close to an obstructed location associated with the small cell, the user terminal excludes the small cell from the connection destination candidates and selects the macro cell providing a small amount of available communication bandwidth as an alternative cell.

Connection destination candidates are cells which are connectable to the user terminal 1 (i.e. the macro cell, the small cell(s), and the wireless LAN cell), and are reported from the macro cell base station 3 or any other source. In other embodiments, the user terminal 1 may be configured to search connectable cells by itself to acquire information on connection destination candidates.

Figure 3:
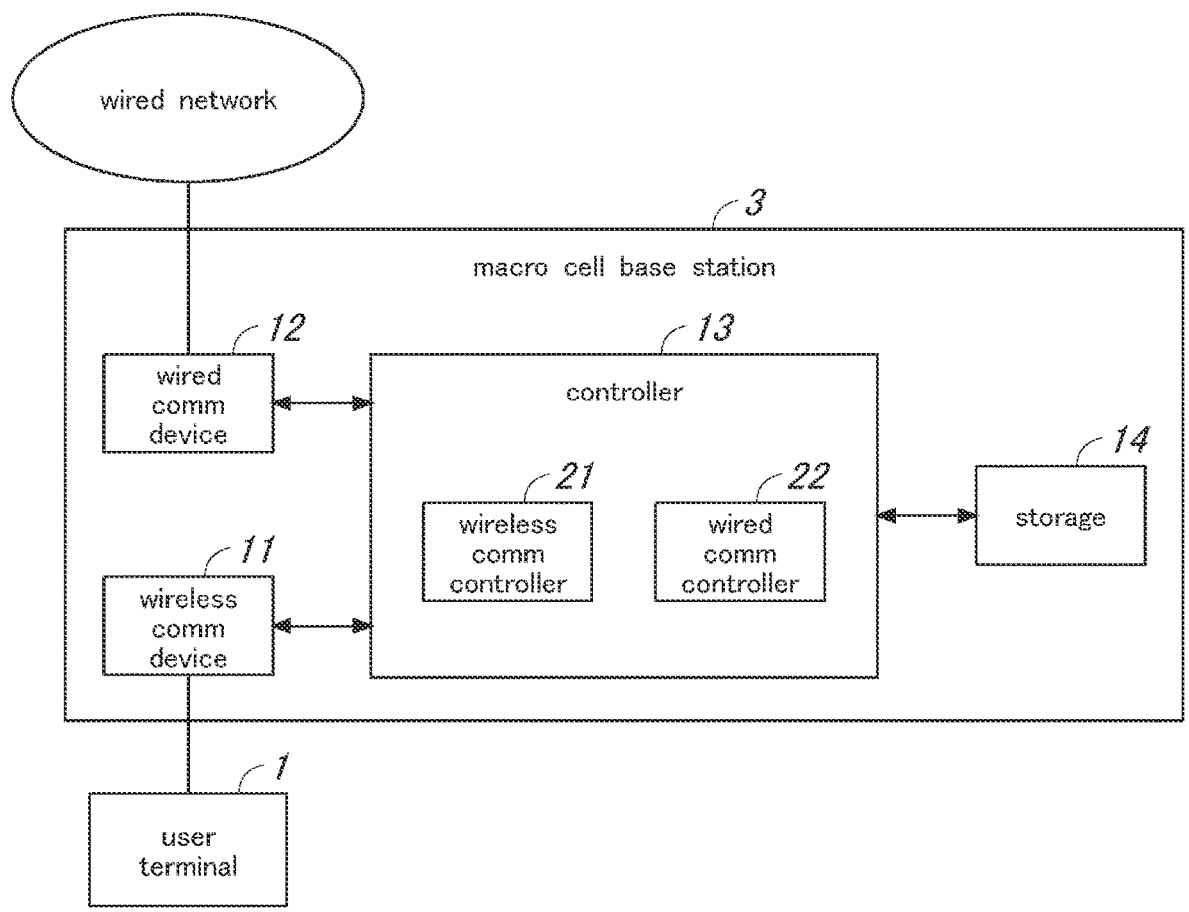
FIG. 3 is a block diagram showing a general configuration of a macro cell base station 3 according to the first embodiment of the present invention.

Next, a general configuration of the macro cell base station 3 according to the first embodiment of the present invention will be described. FIG. 3 is a block diagram showing a general configuration of the macro cell base station 3.

The macro cell base station 3 includes a wireless communication device 11, a wired communication device 12, a controller 13, and a storage 14.

The wireless communication device 11 performs wireless communication with the user terminal 1.

The wired communication device 12 performs wired communication with the communication control device 6 such as S-GW, a nearby macro cell base station(s) 3 and/or a nearby small cell base station(s) 4.

The storage 14 stores information on the user terminal 1, information on other nearby macro cell base station(s) 3 and small cell base station(s) 4, and a program(s) executable by a processor which implements the controller 13.

The controller 13 includes a wireless communication controller 21 and a wired communication controller 22. The controller 13 is implemented by the processor, and each part of the controller 13 is implemented by the processor executing a corresponding program stored in the storage 14.

The wireless communication controller 21 is configured to control wireless communication with the user terminal 1 based on communication quality information transmitted from the user terminal 1, and instruct the user terminal 1 to change its connection destination to a proper one.

The wired communication controller 22 is configured to exchange information on connection destination(s) of the user terminal or some other information through wired communication with the communication control device 6 such as S-GW, the nearby macro cell base station(s) 3 and/or the nearby small cell base station(s) 4.

In FIG. 3, the general configuration of the macro cell base station 3 is shown. However, each small cell base station 4 and the wireless LAN access point 5 have substantially the same general configuration as the macro cell base station.

Figure 4:
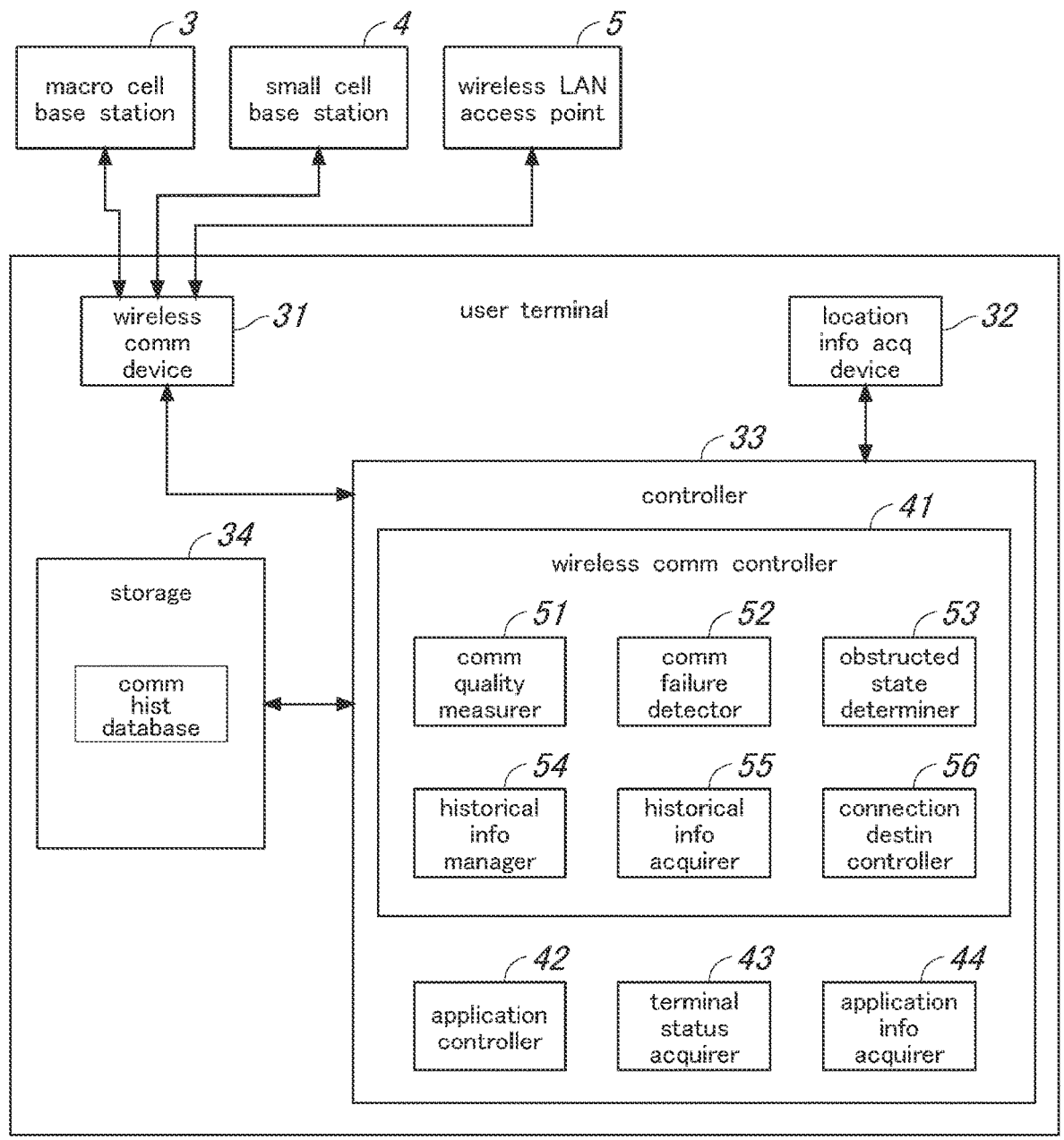
FIG. 4 is a block diagram showing a general configuration of a user terminal 1 according to the first embodiment of the present invention.

Next, a general configuration of the user terminal 1 according to the first embodiment of the present invention will be described. FIG. 4 is a block diagram showing a general configuration of the user terminal 1.

The user terminal 1 includes a wireless communication device 31, a location information acquisition device 32, a controller 33, and a storage 34.

The wireless communication device 31 performs wireless communication with the macro cell base station 3, the small cell base stations 4, and the wireless LAN access point 5, which construct a 5G heterogeneous network, and performs communication with the server 2 via the 5G heterogeneous network and the wired network.

The location information acquisition device 32 acquires location information on the location of the user terminal itself by using a satellite positioning system such as a GPS (Global Positioning System).

The storage 34 stores information on the user terminal itself, information on base stations 3, 4, 5. Moreover, the storage 34 stores information registered in a communication history database (See FIG. 5). Information registered in the communication history database includes obstructed locations where, for each of the obstructed locations, decrease in communication quality due to obstruction has occurred before. The storage 34 also stores programs executable by a processor, which implement the controller 33.

The controller 33 includes a wireless communication controller 41, an application controller 42, a terminal status acquirer 43, and an application information acquirer 44. The controller 33 is implemented by the processor, and each part of the controller 33 is implemented by the processor executing a corresponding program stored in the storage 34.

The application controller 42 performs an operation(s) required for each application, and transmits and receives data to and from the server 2 via the wireless communication device 31.

The terminal status acquirer 43 acquires information on a current location at which the user terminal is currently located and information on current moving status (moving velocity and moving direction) as terminal status information.

The application information acquirer 44 monitors communication performed by the application controller 42 and acquires application information on a type of application currently performing communication.

The wireless communication controller 41 controls wireless communication performed by the wireless communication device 31, and includes a communication quality measurer 51, a communication failure detector 52, an obstructed state determiner 53, a historical information manager 54, a historical information acquirer 55, and a connection destination controller 56.

The communication quality measurer 51 measures a current communication quality level associated with a currently-connected cell (serving cell).

The communication failure detector 52 detects a state in which the user terminal cannot receive a signal from any of the base stations 3, 4, and 5; that is, RLF (Radio Link Failure).

The obstructed state determiner 53 determines whether or not the user terminal is in an obstructed state in which decrease in communication quality due to obstruction is occurring based on a result of measurement by the communication quality measurer 51 and a result of detection by the communication failure detector 52.

The historical information manager 54 determines whether or not the current location is an obstructed location based on a result of determination by the obstructed state determiner 53. If the current location is an obstructed location, the historical information manager 54 registers current location information and information on current communication status in the communication history database in the storage 34 as historical obstruction information.

Preferably, the historical information manager 54 may be configured to determine that the current location is an obstructed location when the obstructed state is detected continuously for a predetermined number of times. In this configuration, accidental decreases in communication quality due to obstruction by moving obstacles can be left out of consideration in determining the obstructed state. In other cases where the obstructed state is frequently detected, the historical information manager 54 may be configured to determine that the current location is an obstructed location when the obstructed state is detected a predetermined number of times within a predetermined time period.

If the historical information manager 54 determines that the current location is not an obstructed location based on a result of determination by the obstructed state determiner 53, the historical information manager 54 transmits an inquiry to the historical information manager 54 to check whether or not the communication history database includes historical obstruction information for the current location. When the communication history database includes historical obstruction information for the current location, the historical information manager 54 determines that an obstacle associated with the current location is removed and deletes the historical obstruction information for the current location from the communication history database.

Preferably, the historical information manager 54 may be configured to determine that the current location is a non-obstructed location when the obstructed state is not detected continuously for a predetermined number of times. In this configuration, accidental decreases in communication quality due to obstruction by moving obstacles can be left out of consideration in determining the obstructed state. In other cases where such a non-obstructed state is frequently detected, the historical information manager 54 may be configured to determine that the current location is a non-obstructed location when the non-obstructed state is detected a predetermined number of times within a predetermined time period.

Targets of the measurement by the communication quality measurer 51 and the detection by the communication failure detector 52 include a currently-connected cell, connection destination candidates (adjacent cells) reported from the macro cell base station 3, and thus the communication history database is updated as necessary.

In response to an inquiry transmitted from the connection destination controller 56, the historical information acquirer 55 searches and acquires historical obstruction information for the current connection destination in the communication history database stored in the storage 34. Also, in response to an inquiry transmitted from the connection destination controller 56, the historical information acquirer 55 searches and acquires historical obstruction information for the connection destination candidates in the communication history database stored in the storage 34.

The connection destination controller 56 performs control operations in order to select a proper connection destination among the macro cell and the small cells and the cell (coverage) of the wireless LAN access point based on historical obstruction information acquired by the historical information acquirer 55.

In the present embodiment, the user terminal determines degrees of risk of occurrence of decrease in communication quality due to obstruction associated with a current connection destination and a future connection destination based on the historical obstruction information and the location information; and controls the connection destination based on a result of determination of the degree of risk. In other words, the user terminal controls the connection destination such that, when there is a risk of occurrence of decrease in communication quality due to obstruction, the user terminal changes its connection destination to a different safer connection destination in which decrease in communication quality due to obstruction does not occur.

Moreover, in the present embodiment, the user terminal defines a risky area for an obstructed location based on the status of the user terminal 1, and determines in advance a degree of risk of occurrence of decrease in communication quality due to obstruction depending on whether or not the user terminal is currently located in the risky area.

Next, a communication history database according to the first embodiment of the present invention will be described. FIG. 5 is an explanatory view showing an example of historical obstruction information registered in the communication history database according to the first embodiment of the present invention.

In the present embodiment, the obstructed state determiner 53 determines whether or not the user terminal is in the obstructed state in which decrease in communication quality due to obstruction is occurring, and the determination is made based on current communication quality associated with the currently-connected cell or any other condition, and when the user terminal is in the obstructed state, the information manager registers current location information and information on current communication status in the communication history database as historical obstruction information.

The communication history database includes historical obstruction information, the historical obstruction information including an obstructed location(s); that is, a location(s) where decrease in communication quality due to obstruction has occurred before, and corresponding communication status. More specifically, items of historical obstruction information includes date, time, location, RAT, frequency, cell ID, beam identifier, moving direction, communication quality, rate of change in communication quality, greatest difference in communication quality between the current location and nearby locations, and RLF determination result.

Figure 6:
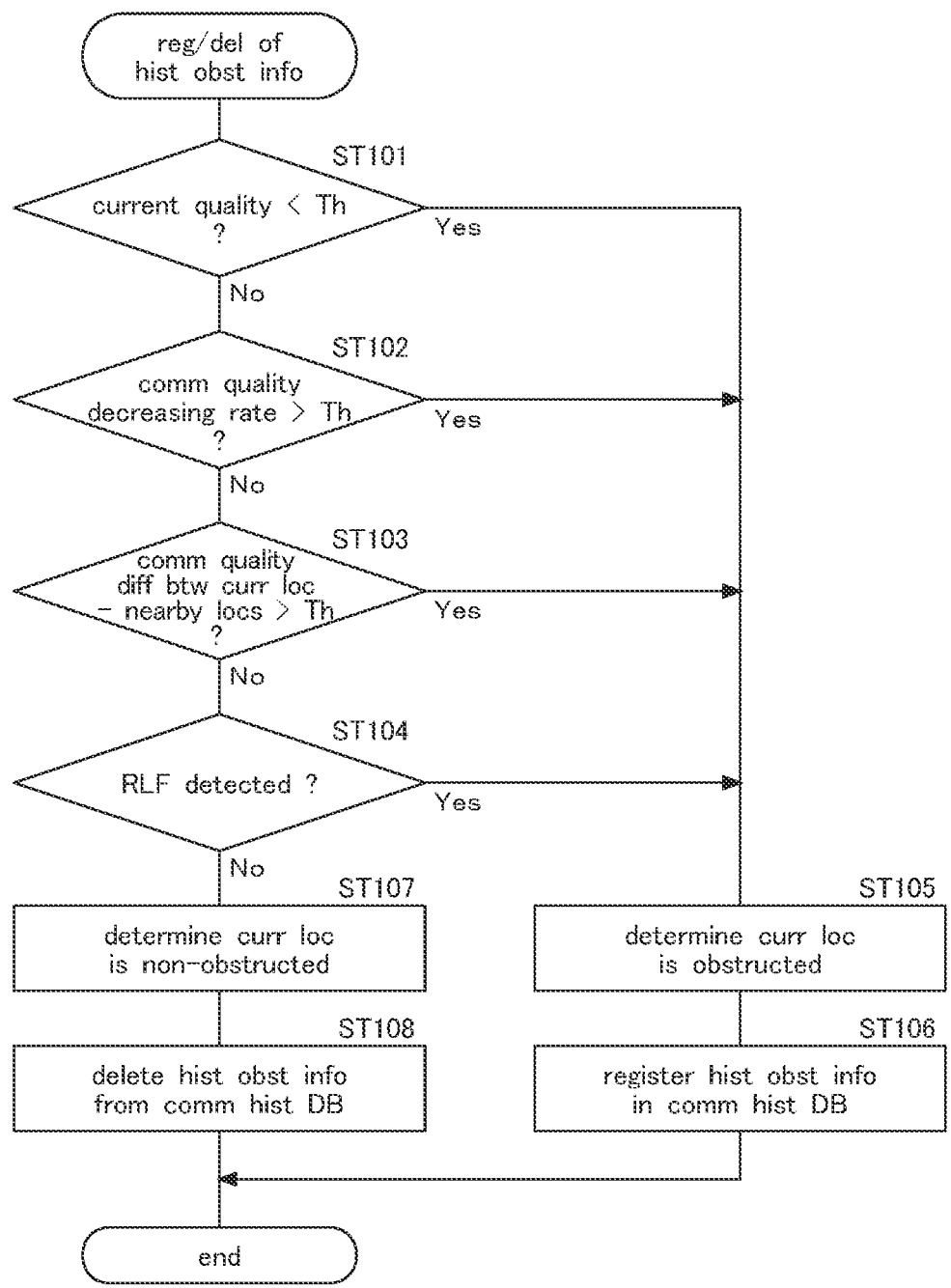
FIG. 6 is a flowchart showing an operation procedure of registration and deletion of historical obstruction information performed by the user terminal 1 according to the first embodiment of the present invention.
Figure 7:
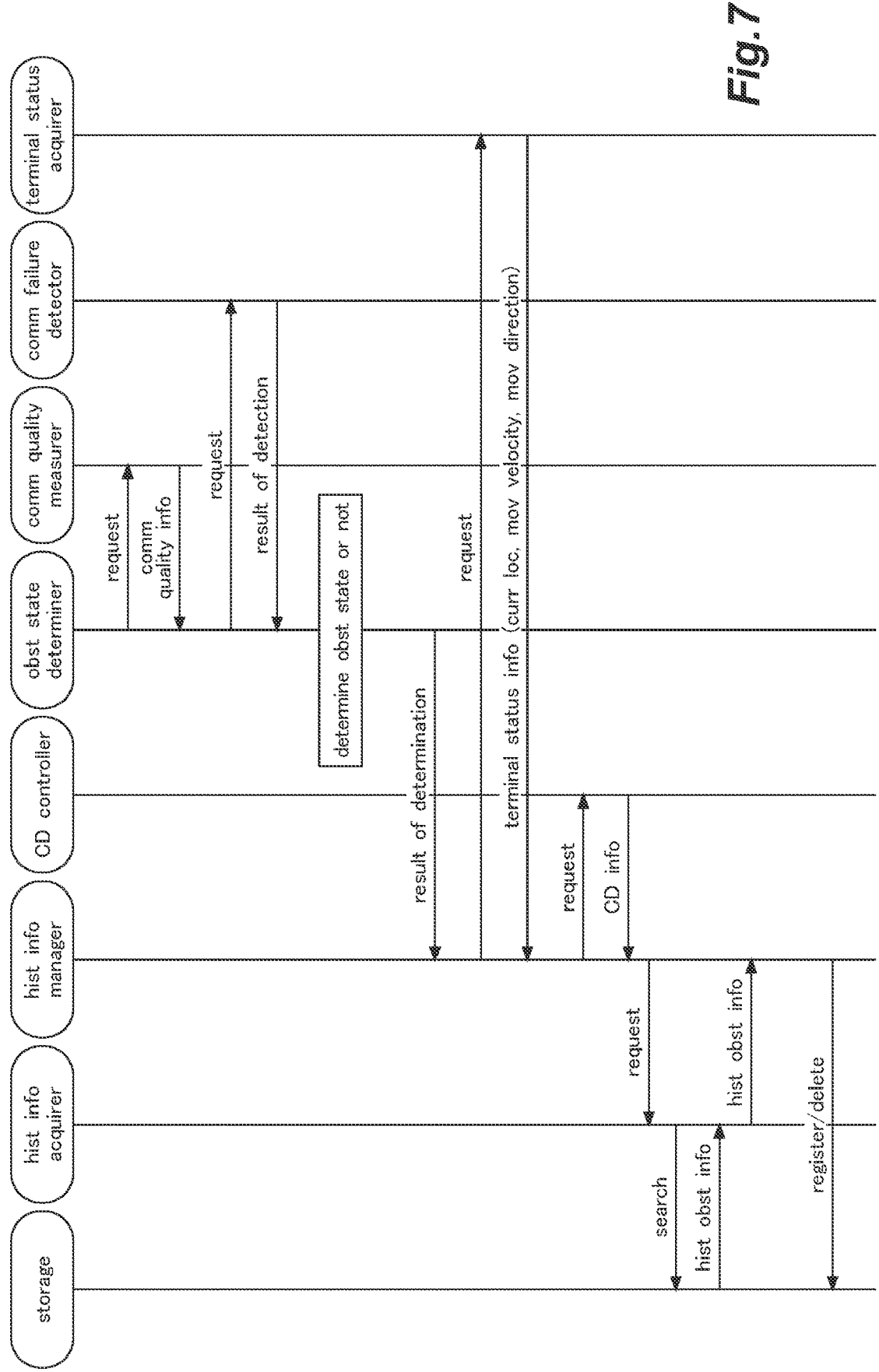
FIG. 7 is a sequence diagram showing an operation procedure of registration and deletion of historical obstruction information performed by the user terminal 1 according to the first embodiment of the present invention.

Next, an operation procedure of registration and deletion of historical obstruction information performed by the user terminal 1 according to the first embodiment of the present invention will be described. FIG. 6 is a flowchart showing the operation procedure of the user terminal 1. FIG. 7 is a sequence diagram showing the operation procedure of the user terminal 1.

In the user terminal 1, the obstructed state determiner 53 conducts determination regarding current communication quality (ST101), determination regarding change in communication quality with time (ST102), determination regarding change in communication quality with location (ST103), and determination regarding RLF (Radio Link Failure) (ST04).

The determination regarding current communication quality (ST101) is conducted in order to determine whether or not current communication quality is good. In this step, the obstructed state determiner 53 acquires current communication quality associated with a currently-connected cell from the communication quality measurer 51, and determines whether or not a value of the acquired current communication quality is lower than a predetermined threshold value Th.

The determination regarding change in communication quality with time (ST102) is conducted in order to determine whether or not change in communication quality with time is significant. In this step, the obstructed state determiner 53 calculates a communication quality decrease rate with time, and determines whether or not the calculated communication quality decrease rate is greater than a predetermined threshold value Th.

The determination regarding change in communication quality with location (ST103) is conducted in order to determine whether or not change in communication quality with location is significant. In this step, the obstructed state determiner 53 calculates a difference in communication quality between the current location and a nearby location, and determines whether or not the calculated difference in communication quality is greater than a predetermined threshold value Th.

In the step of determination regarding RLF (Radio Link Failure)(ST104), the obstructed state determiner 53 acquires a result of detection of RLF (Radio Link Failure) from the communication failure detector 52, and determines whether RLF is detected or not.

If a value of the current communication quality is lower than a predetermined threshold value Th (Yes in ST101), or if a communication quality decrease rate is greater than a predetermined threshold value Th (Yes in ST102), or if a difference in communication quality is greater than a predetermined threshold value Th (Yes in ST103), or if RLF is detected, i.e. Radio Link Failure occurs (Yes in ST104), the obstructed state determiner 53 determines that the current location is an obstructed location (ST105).

The historical information manager 54 acquires terminal status information (current location, moving velocity and moving direction) from the terminal status acquirer 43, and the historical information manager 54 also acquires information on a current connection destination from the connection destination controller 56 and registers current location information, i.e., information on the current location (obstructed location) and information on other current communication status (such as connection destination) in the communication history database in the storage 34 as historical obstruction information (ST106).

If a value of the current communication quality is not lower than a predetermined threshold value Th (No in ST101), or if a communication quality decrease rate is not greater than a predetermined threshold value Th (No in ST102), or if a difference in the communication quality is not greater than a predetermined threshold value Th (No in ST103), or if RLF is not detected (No in ST104), the obstructed state determiner 53 determines that the current location is a non-obstructed location (ST107).

Then, the historical information manager 54 transmits an inquiry to the historical information manager 54 to check whether or not the communication history database includes historical obstruction information for the current location. If the historical obstruction information is present, the historical information manager 54 deletes the historical obstruction information for the current location from the communication history database (ST108).

In this way, in the present embodiment, if current communication quality is not good, or if change in communication quality with time is significant, or if change in communication quality with location is significant, or if RLF is detected, the obstructed state determiner 53 determines that the current location is an obstructed location and the historical information manager 54 registers information on current communication status for the current location in the communication history database in the storage 34 as historical obstruction information.

Preferably, when performing the control operations, an area having a certain size is regarded as an obstructed location. For example, mesh element areas each having a predetermined shape (e.g. square, circle, ellipse) and a uniform size (e.g. 1 meter square) may be determined over an entire area including the macro cell, the smell cells, and the wireless LAN cell so as to enable determination of an obstructed location on an mesh-element-area basis.

Next, processing operations performed by the connection destination controller 56 will be described. FIG. 8 is an explanatory view showing a risky area defined by the connection destination controller 56.

In the present embodiment, the connection destination controller 56 defines a risky area for an obstructed location, and determines a degree of risk of occurrence of decrease in communication quality due to obstruction based on whether or not the user terminal is currently located in the risky area. A risky area is first defined in a circular shape centering on an obstructed location.

The degree of risk of occurrence of decrease in communication quality varies depending on whether or not the user terminal 1 reaches an obstructed location in a short time period. In this view, in the present embodiment, the size of a risky area is determined based on moving status of the user terminal 1.

Whether or not the user terminal 1 reaches an obstructed location in a short time period can be determined based on the velocity component Va in the direction A from the current location Pc to the obstructed location Pd of the moving velocity V of the user terminal 1. In this view, in the present embodiment, the A-direction velocity component Va of the moving velocity V is calculated from the current location Pc, the obstructed location Pd, and the moving velocity V and the moving direction of the user terminal 1, and the size of a risky area is determined based on the A-direction velocity component Va of the moving velocity V. Specifically, when the A-direction velocity component Va is small, a risky area is defined to have a small size, while when the A-direction velocity component Va is large, a risky area is defined to have a large size.

In the present embodiment, the radius of a risky area is determined by adding an offset O (correction value), which is determined by the A-direction velocity component Va of the moving velocity V, to a reference radius L (e.g. 1 m).

Figure 8A:
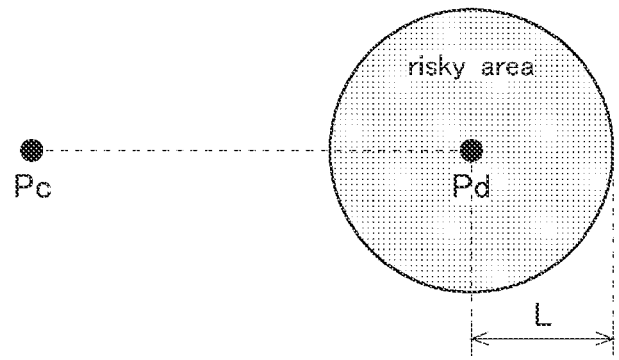
FIGS. 8A, 8B, and 8C are explanatory views showing a risky area defined by a connection destination controller 56 according to the first embodiment of the present invention.

As shown in FIG. 8A, when the moving velocity component Va is zero, (when the user terminal 1 does not move in the direction Da), the radius of a risky area is a reference radius L determined by adding no offset O to the reference radius L. In this case, when the distance between the current location Pc of the user terminal 1 and the obstructed location Pd is smaller than the reference radius L, the user terminal 1 is determined to be located in a risky area and in a risky state.

Figure 8B:
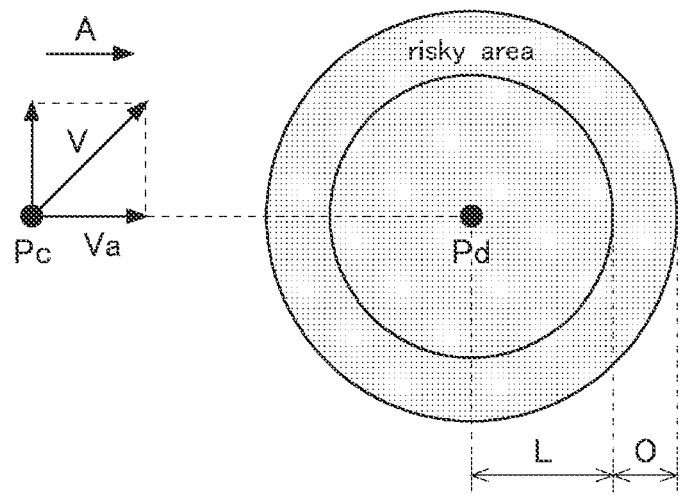

As shown in FIG. 8B, when the moving velocity component Va is small, (when the user terminal 1 moves at a low velocity in the A direction), the radius of a risky area is determined by adding a small offset O to the reference radius L. In this case, when the distance between the current location Pc of the user terminal 1 and the obstructed location Pd is smaller than a value obtained by adding the small offset O to the reference radius L, the user terminal 1 is determined to be located in a risky area and in the risky state.

Figure 8C:
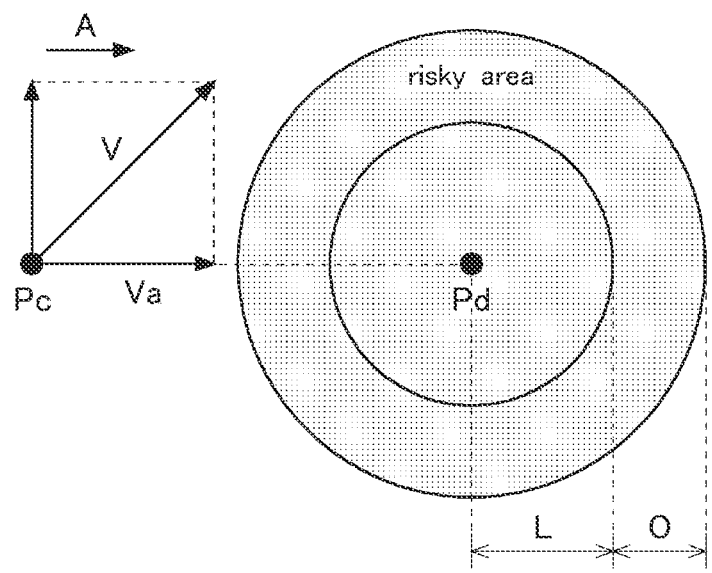

As shown in FIG. 8C, when the moving velocity component Va is large, (when the user terminal 1 moves at a high velocity in the A direction), the radius of a risky area is determined by adding a large offset O to the reference radius L. In this case, when the distance between the current location Pc of the user terminal 1 and the obstructed location Pd is smaller than a value obtained by adding the large offset O to the reference radius L, the user terminal 1 is determined to be located in a risky area and be in the risky state.

Required transmission characteristics such as communication stability vary depending on a type of application currently performing communication. In this view, in the present embodiment, the size of a risky area is determined based on a type of application currently performing communication.

For example, in the case of an application for transferring data using FTP, since the communication stability does not matter so much and thus momentary interruptions and sudden drops in transmission rate are permitted to some extent, the size of a risky area is determined to be small, or a degree of risk of occurrence of decrease in communication quality is determined based on whether or not the user terminal is located in an obstructed location without using any risky area. In the case of an application for transmitting video data, since momentary interruptions and sudden drops in transmission rate are not permitted, the size of a risky area is determined to be large.

How much transmission characteristics (such as communication stability) affect QoE (Quality of Experience) varies depending on a type of the user terminal 1. In this view, in the present embodiment, the size of a risky area is determined based on a type of the user terminal 1.

For example, in the case that the user terminal 1 is one used for reporting measurement results of various meters and sensors (measuring devices), since transmission characteristics (such as communication stability) substantially do not affect QoE, the size of a risky area is determined to be small, or a degree of risk of occurrence of decrease in communication quality is determined based on whether or not the user terminal is located in an obstructed location without using any risky area. In the case that the user terminal 1 is a mobile device such as smartphone, since transmission characteristics (such as communication stability) affect QoE, the size of a risky area is determined to be large.

In this way, in the present embodiment, the size of a risky area is determined based on moving status of the user terminal 1, a type of application currently performing communication, and a type of the user terminal 1. However, the size of a risky area may be determined based on any one of these conditions. In other cases, the size of a risky area may be determined based on any combination of the conditions. In the case of determination based on any combination of these conditions, moving status of the user terminal 1 is preferably used as a primary basis for determining a risky area.

The user terminal 1 is preferably configured to constantly measure communication quality levels of cells found by performing a cell search operation, and update communication history database as necessary based on measurement results. In this case, when the user terminal 1 finds a new obstructed location, historical obstruction information is registered in the communication history database, and when finding an improvement of communication quality, the user terminal 1 deletes historical obstruction information from the communication history database.

In this case, the user terminal 1 is preferably configured such that, when the user terminal 1 finds a location where current communication quality is good within a risky area defined in a circular shape centering on an obstructed location, the user terminal 1 redefines the risky area by deleting such a location from the risky area. In this way, the shape of a risky area can be gradually brought closer to that of an actual obstructed area where decrease in communication quality actually occurs due to obstruction, whereby a proper risky area is formed.

Figure 9:
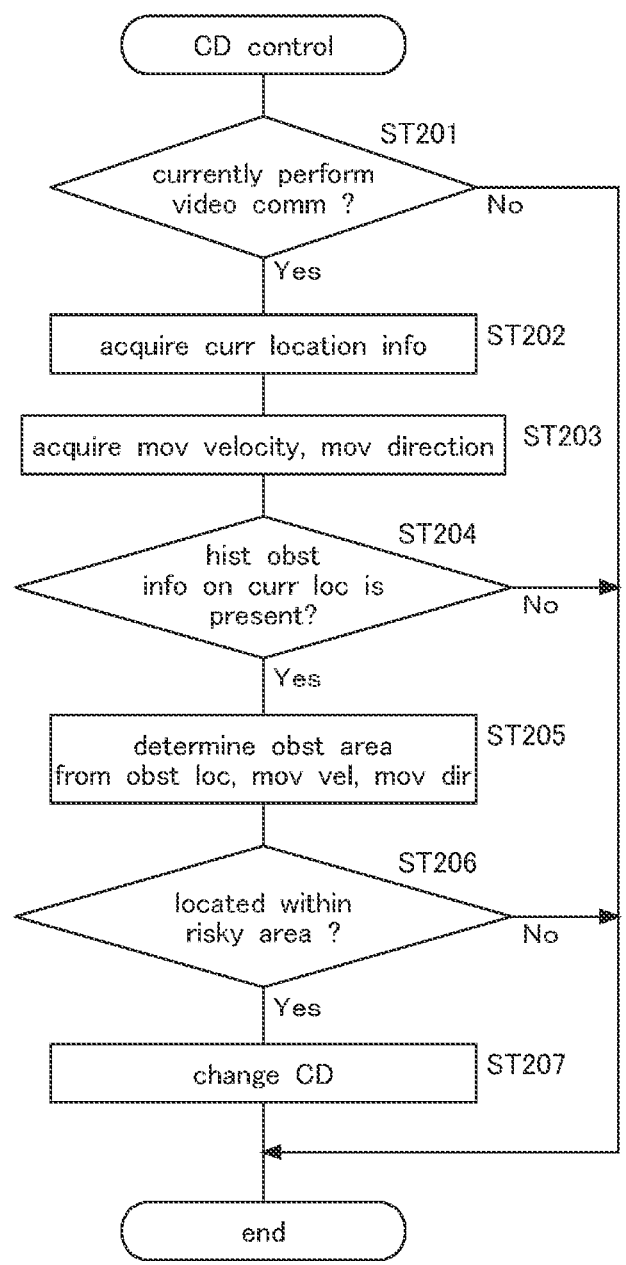
FIG. 9 is a flowchart showing an operation procedure of a connection destination change operation performed by the user terminal 1 according to the first embodiment of the present invention.
Figure 10:
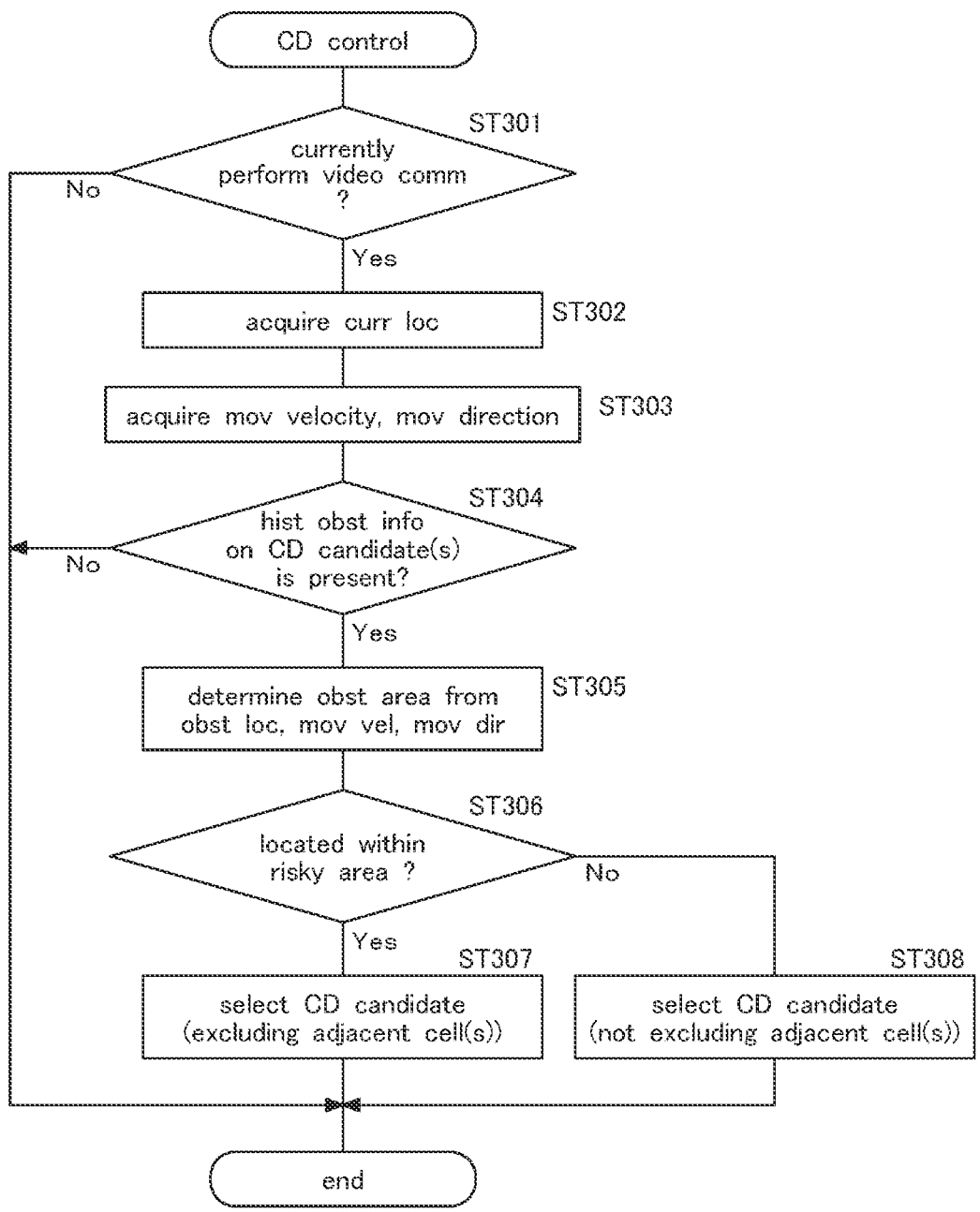
FIG. 10 is a flowchart showing an operation procedure of a connection destination candidate selection operation performed by the user terminal 1 according to the first embodiment of the present invention.
Figure 11:
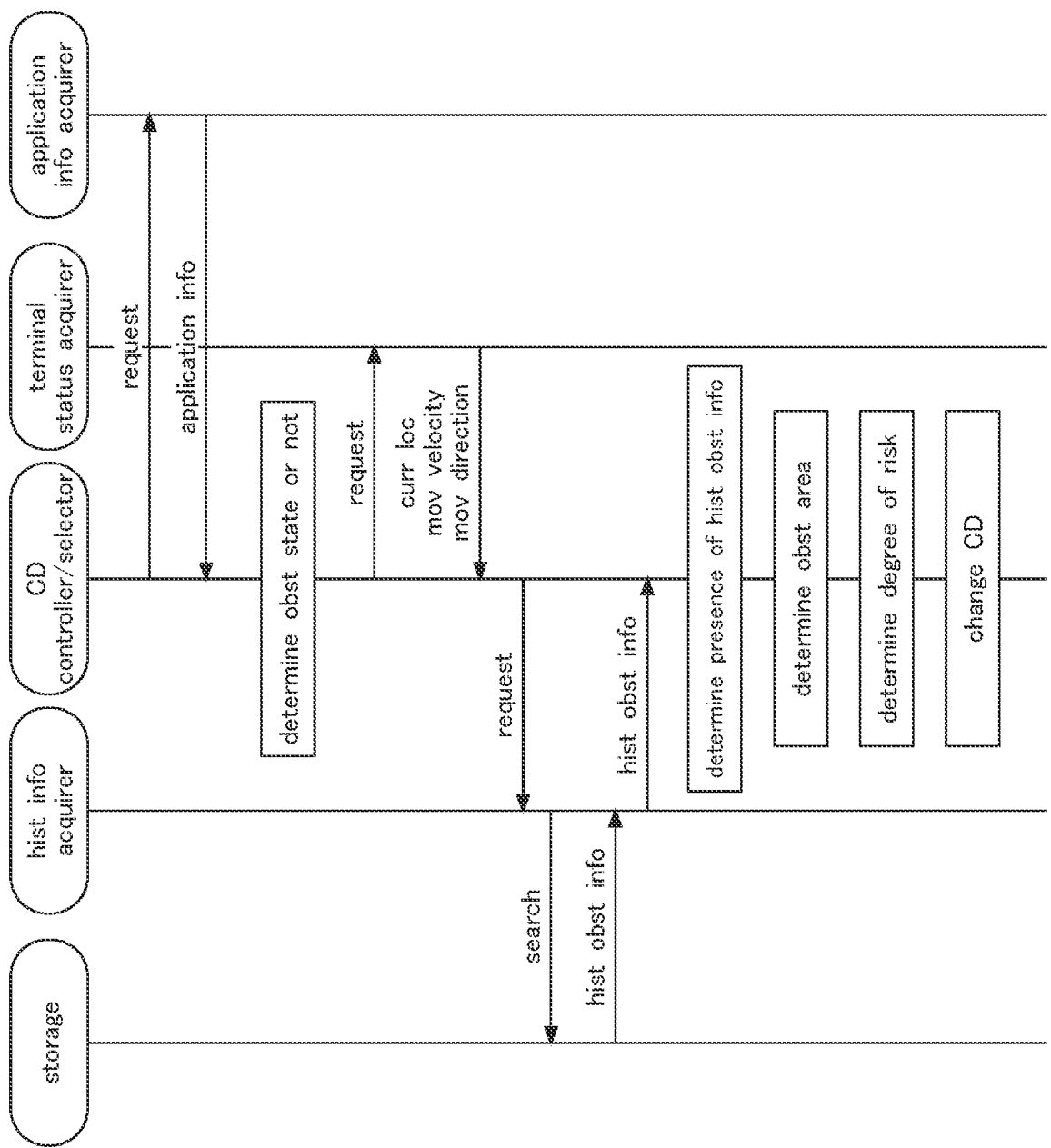
FIG. 11 is a sequence diagram showing an operation procedure of the user terminal 1 according to the first embodiment of the present invention.

Next, operation procedures of a connection destination change operation and a connection destination candidate selection operation performed by the user terminal 1 according to the first embodiment will be described. FIG. 9 is a flowchart showing an operation procedure of the connection destination change operation performed by the user terminal 1. FIG. 10 is a flowchart showing an operation procedure of the connection destination candidate selection operation performed by the user terminal 1. FIG. 11 is a sequence diagram showing an operation procedure of the user terminal 1.

As shown in FIG. 9, when performing the connection destination change operation, the connection destination controller 56 acquires application information on an application currently performing communication from the application information acquirer 44, and determines whether or not the application currently performs video communication (i.e. transmission and/or reception of video data) based on the application information (ST201).

If currently performing video communication (Yes in ST201), the connection destination controller 56 acquires current location information for a current location of the user terminal from the terminal status acquirer 43 (ST202). Also, the connection destination controller 56 acquires a moving velocity and a moving direction of the user terminal from the terminal status acquirer 43 (ST203).

Next, the connection destination controller 56 transmits an inquiry to the historical information manager 54 to check whether or not historical obstruction information on the current connection destination is present (ST204). Upon receiving the inquiry, the historical information manager 54 searches and (if found) acquires the requested historical obstruction information in the communication history database stored in the storage 34.

If the historical obstruction information on the current connection destination is present (Yes in ST204), the connection destination controller 56 calculates an offset based on an obstructed location included in the historical obstruction information for the current connection destination, a moving velocity and a moving direction of the user terminal, and then determines an obstructed area (ST205).

Next, the connection destination controller 56 determines whether or not the user terminal is located within a risky area based on the current location information of the user terminal (ST206). Then, the connection destination controller 56 calculates a distance from the current location of the user terminal to the obstructed location, and determines whether the distance is greater than the radius of the risky area (a value obtained by adding the offset to a reference value).

If the user terminal is located within the risky area (Yes in ST206), the connection destination controller 56 changes its connection destination (ST207).

If the connection destination controller 56 does not perform video communication (No in ST201), or if the user terminal is not located within the risky area (No in ST206), the connection destination controller 56 ends the operation without any further processing.

It should be noted that, since a new connection destination is determined by a network side device such as the macro cell base station 3, the connection destination controller 56 only has to request such a network side device to determine a new connection destination in such a manner as to avoid connecting to a particular cell(s). In this case, the connection destination controller 56 may, for example, add information on a cell(s)(such as cell ID) which is to be excluded from connection destination candidates to a cell-change request message.

In other cases, the connection destination controller 56 may transmit to a network side device a cell-change request message which requests to change the connection destination from the current connection destination to a different cell. In this case, the connection destination controller 56 preferably adds information on a cause for requesting the cell change (i.e. an expected communication failure due to obstruction) to a cell-change request message.

As shown in FIG. 10, when selecting connection destination candidates, the connection destination controller 56 acquires application information on an application currently performing communication from the application information acquirer 44, and determines whether or not the application currently performs video communication (i.e., transmission and/or reception of video data) based on the application information (ST301).

If the application currently performs video communication (Yes in ST301), the connection destination controller 56 acquires current location information for a current location of the user terminal from the terminal status acquirer 43 (ST302). Also, the connection destination controller 56 acquires a moving velocity and a moving direction of the user terminal from the terminal status acquirer 43 (ST303).

Next, the connection destination controller 56 transmits an inquiry to the historical information manager 54 to check whether or not historical obstruction information on each of the connection destination candidate cells (adjacent cells) is present (ST304). Upon receiving the inquiry, the historical information manager 54 searches and (if found) acquires the requested historical obstruction information in the communication history database stored in the storage 34.

If the historical obstruction information on any one of the connection destination candidate cells is present (Yes in ST304), the connection destination controller 56 calculates an offset based on an obstructed location included in the historical obstruction information for the connection destination candidate cell, a moving velocity and a moving direction of the user terminal, and then determines an obstructed area (ST305).

Next, the connection destination controller 56 determines whether or not the user terminal is located within a risky area based on the current location information of the user terminal (ST306). Then, the connection destination controller 56 calculates a distance from the current location of the user terminal to the obstructed location, and determines whether the distance is greater than the radius of the risky area (a value obtained by adding the offset to a reference value).

If the user terminal is located within the risky area (Yes in ST306), the connection destination controller 56 selects connection destination candidates in such a manner as to avoid selecting a connection destination candidate(s) for which historical obstruction information is present (ST307).

If the user terminal is not located within the risky area (No in ST306), the connection destination controller 56 selects connection destination candidates so as not to exclude a connection destination candidate(s) for which historical obstruction information is present (ST308).

If the connection destination controller 56 does not perform video communication (No in ST301) or if the historical obstruction information on any one of the connection destination candidate cells is not present (No in ST304), the connection destination controller 56 ends the operation without any further processing.

It should be noted that, since a new connection destination is determined by a network side device such as the macro cell base station 3, when excluding a particular cell(s) from connection destination candidates, the connection destination controller 56 only has to request such a network side device to determine a new connection destination in such a manner as to avoid connecting to the particular cell(s) to be excluded. In this case, the connection destination controller 56 may be configured to, when transmitting a measurement report for reporting communication quality measurements, change a measurement result for each cell to be excluded to a lower value than an actual measurement result or to exclude cells to be excluded from cells for which the connection destination controller 56 is to report measurement results. The network side device selects a cell providing the highest communication quality as a connection destination, and thus excludes the cell(s) s to be excluded from connection destination candidates because of its poor communication quality.

In the embodiments shown in FIGS. 9, 10 and 11, the user terminal performs the connection destination change operation and the connection destination candidate selection operation only while an application is currently performing video communication. In other embodiments, the user terminal may be configured to be capable of performing the operations while an application is not performing video communication.

Second Embodiment

Next, a second embodiment of the present invention will be described. Except for what will be discussed here, this embodiment is the same as the above-described embodiment.

In the first embodiment, the user terminal 1 is configured to determine the size of a risky area based on moving status (a moving velocity and a moving direction) of the user terminal 1, and then determine a degree of risk of occurrence of decrease in communication quality based on whether or not the user terminal 1 is located within the risky area. However, in the present embodiment, a user terminal 1 determines a degree of risk of occurrence of decrease in communication quality based on a time period required for the user terminal to reach the obstructed location (accession time period).

Specifically, the user terminal calculates a distance from the current location of the user terminal to the obstructed location. Then, the user terminal calculates an accession time period based on the calculated distance and a moving velocity and a moving direction of the user terminal 1, and then determines whether or not the accession time period is shorter than a predetermined threshold value. If the accession time period is shorter than the predetermined threshold value, the user terminal 1 determines that there is a risk of occurrence of decrease in communication quality.

For example, in cases where the distance from the current location of the user terminal to the obstructed location is 30 m and the predetermined threshold value is 10 s, when a moving velocity is 4 km/h, the accession time period is 27 s, which is longer than the threshold value of 10 s and thus the user terminal determines that there is not a risk of occurrence of decrease in communication quality. When a moving velocity is 30 km/h, the accession time period is 3.6 s, which is shorter than the threshold value of 10 s and thus the user terminal determines that there is a risk of occurrence of decrease in communication quality.

The user terminal 1 preferably calculates an accession time period based on a velocity component in the direction from the current location of the user terminal 1 to an obstructed location in the same manner as the first embodiment.

In the first embodiment, the user terminal 1 is configured to determine the size of a risky area based on moving status of the user terminal 1, a type of application currently performing communication, and/or a type of the user terminal 1 in order to determine a degree of risk of occurrence of decrease in communication quality. The user terminal 1 in the present embodiment may also be configured to determine a degree of risk of occurrence of decrease in communication quality based on moving status of the user terminal 1, a type of application currently performing communication, and/or a type of the user terminal 1 in the same manner as the first embodiment. In this case, the threshold value may be changed or the accession time period may be corrected based on moving status of the user terminal 1, a type of application currently performing communication, and/or a type of the user terminal 1.

Figure 12:
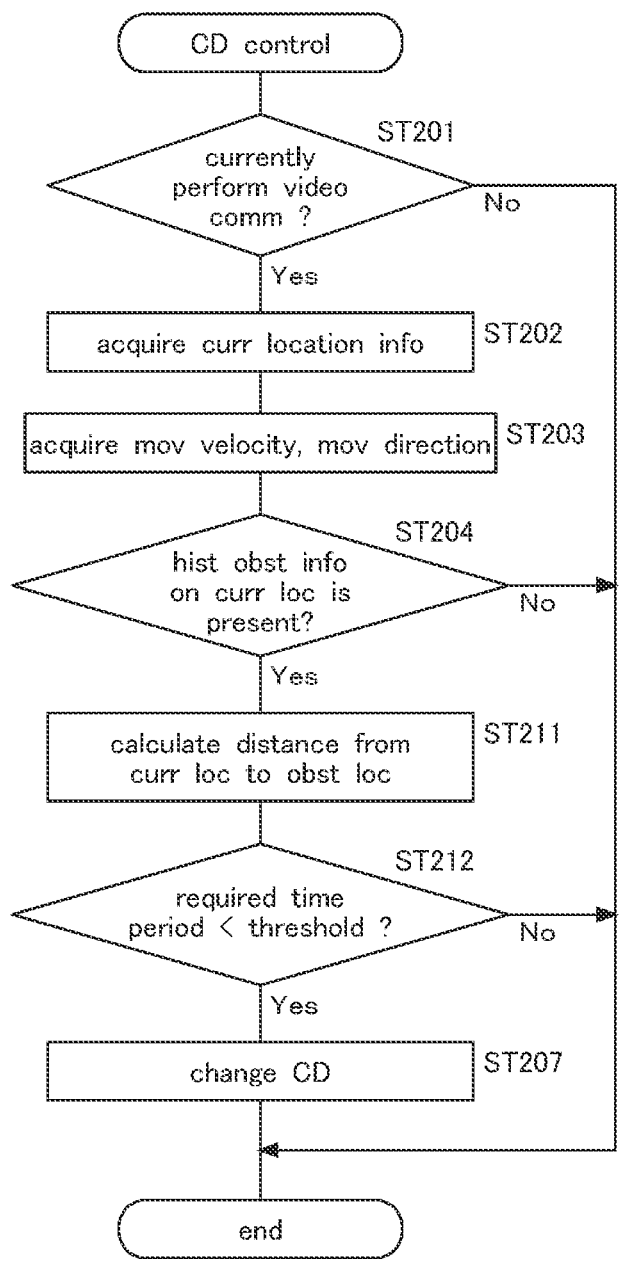
FIG. 12 is a flowchart showing an operation procedure of a connection destination change operation performed by a user terminal 1 according to a second embodiment of the present invention.
Figure 13:
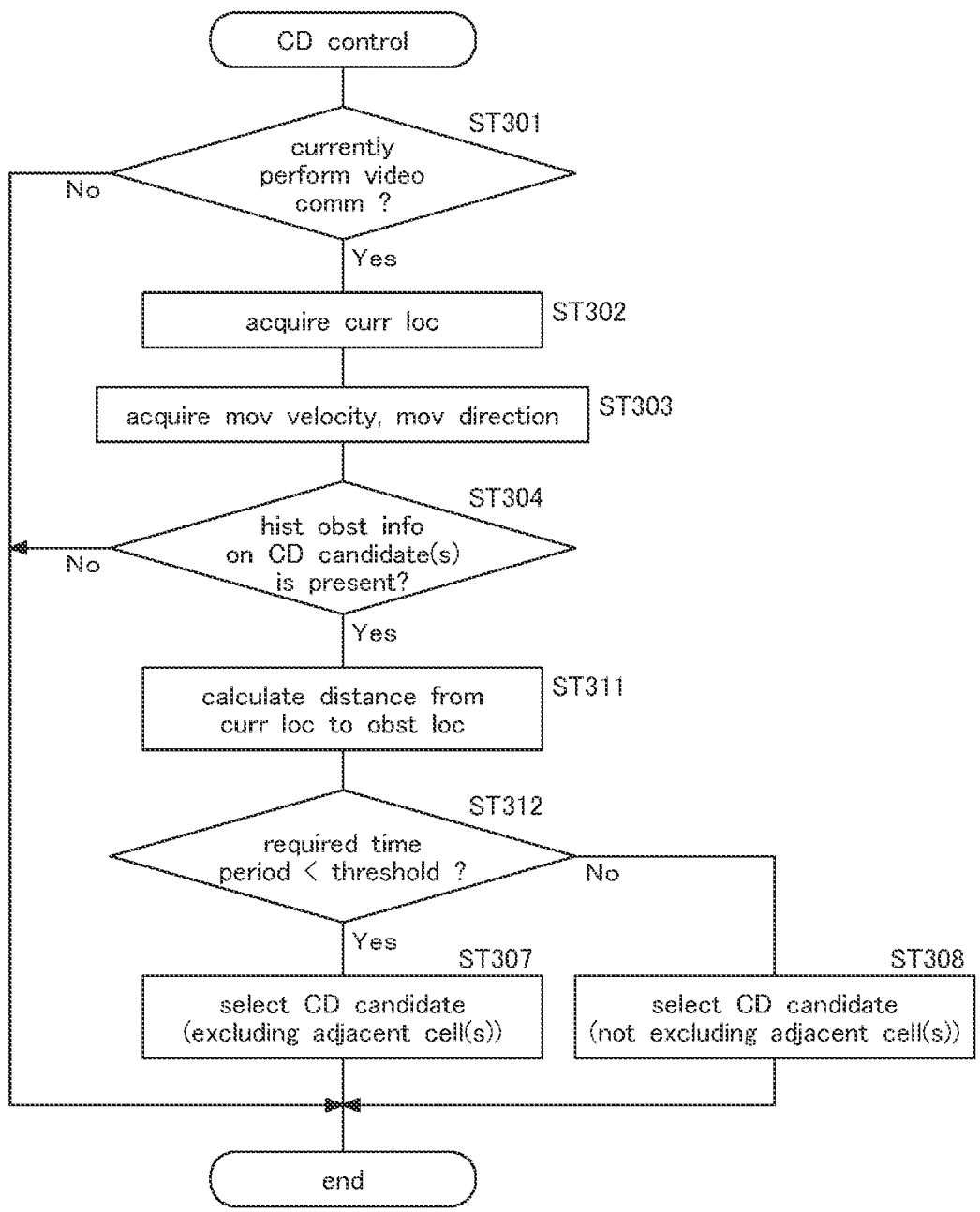
FIG. 13 is a flowchart showing an operation procedure of a connection destination candidate selection operation performed by the user terminal 1 according to the second embodiment of the present invention.

Next, an operation procedure of the user terminal 1 according to the second embodiment will be described. FIG. 12 is a flowchart showing an operation procedure of a connection destination change operation performed by a user terminal 1. FIG. 13 is a flowchart showing an operation procedure of a connection destination candidate selection operation.

As shown in FIG. 12, when performing the connection destination change operation, the connection destination controller 56 performs the processing operations from ST201 to ST204 in the same manner as the first embodiment (See FIG. 9).

If the historical obstruction information on the current connection destination is present (Yes in ST204), the connection destination controller 56 calculates a distance from the current location of the user terminal to the obstructed location based on historical obstruction information for a current connection destination and information on the current location of the user terminal (ST211).

Next, the connection destination controller 56 calculates an accession time period based on the distance from the current location to the obstructed location, and a moving velocity and a moving direction of the user terminal 1, and then determines whether or not the accession time period is shorter than a predetermined threshold value (ST212).

If the accession time period is shorter than the predetermined threshold value; that is, there is a risk of occurrence of decrease in communication quality (Yes in ST212), the connection destination controller 56 changes the connection destination (ST207).

If the accession time period is not shorter than the predetermined threshold value; that is, there is not a risk of occurrence of decrease in communication quality (No in ST212), the connection destination controller 56 ends the operation without any further processing.

As shown in FIG. 13, when selecting connection destination candidates, the connection destination controller 56 performs the processing operations from ST301 to ST304 in the same manner as the first embodiment (See FIG. 10).

If the historical obstruction information on any one of the connection destination candidates is present (Yes in ST304), the connection destination controller 56 calculates a distance from the current location of the user terminal to the obstructed location based on historical obstruction information for the connection destination candidate and information on the current location of the user terminal (ST311).

Next, the connection destination controller 56 calculates an accession time period based on the distance from the current location to the obstructed location and a moving velocity and a moving direction of the user terminal 1, and then determines whether or not the accession time period is shorter than a predetermined threshold value (ST312).

If the accession time period is shorter than the predetermined threshold value; that is, there is a risk of occurrence of decrease in communication quality (Yes in ST312), the connection destination controller 56 selects connection destination candidates in such a manner as to avoid selecting a connection destination candidate(s) for which historical obstruction information is present (ST307).

If the accession time period is not shorter than the predetermined threshold value; that is, there is not a risk of occurrence of decrease in communication quality (No in ST312), the connection destination controller 56 selects connection destination candidates so as not to exclude a connection destination candidate(s) for which historical obstruction information is present (ST308).

Third Embodiment

Next, a third embodiment of the present invention will be described. Except for what will be discussed here, this embodiment is the same as the above-described embodiments. FIG. 14 is an explanatory view showing an outline of connection destination control operations performed by a user terminal 1 according to the third embodiment of the present invention.

In the above-described embodiments, the user terminal 1 is configured to determine a degree of risk of occurrence of decrease in communication quality and control a cell of as the connection destination. However, in the present embodiment, a user terminal 1 controls a beam used as the connection destination. The other control operations of the present embodiment are the same as the above-described embodiments, which means that, in the present embodiment, a cell(s) in the above-described embodiments is replaced with a beam(s).

For example, with regard to a change in its connection destination, the user terminal determines a degree of risk of occurrence of decrease in communication quality associated with a currently-connected beam, and when there is a risk of occurrence of decrease in communication quality associated with the currently-connected beam, the user terminal changes the beam as the connection destination from the currently-connected beam to a different beam. This control enables the user terminal to change its connection destination from the currently-connected beam to another safe beam which does not involve a risk of occurrence of decrease in communication quality.

Figure 14A:
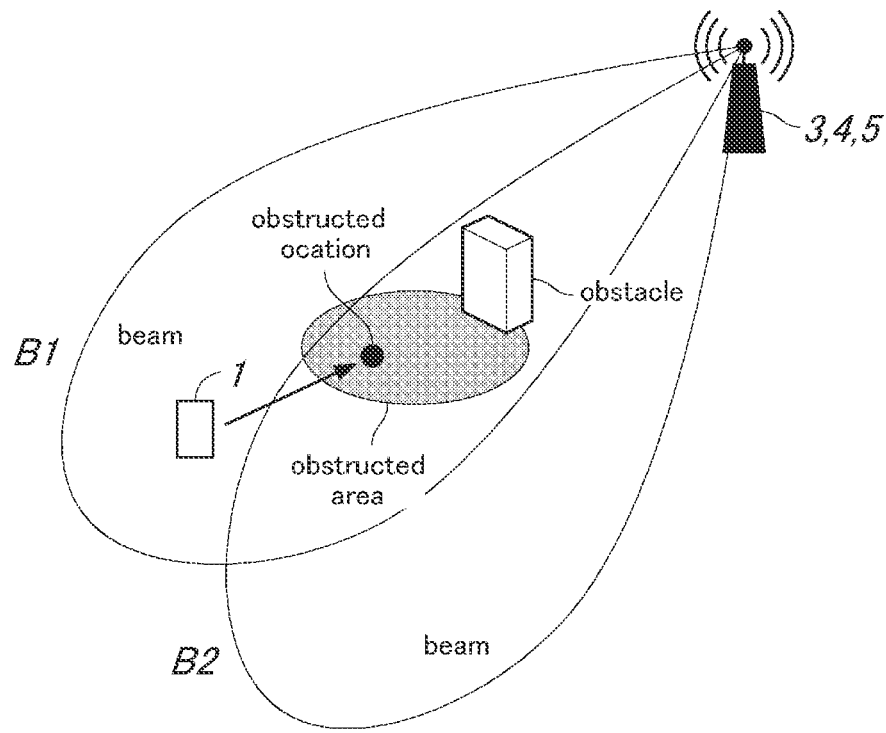
FIGS. 14A and 14B are explanatory views showing an outline of connection destination control operations performed by a user terminal 1 according to a third embodiment of the present invention.

In an example shown in FIG. 14A, when the user terminal 1 has reached a location close to the obstructed location associated with the currently-connected beam B1, the user terminal changes its connection destination from the currently-connected beam to the safe beam B2 which does not involve a risk of occurrence of decrease in communication quality.

Moreover, when the user terminal 1 reaches a boundary of a currently-connected beam and then changes its connection destination to another beam, the user terminal 1 determines a degree of risk of occurrence of decrease in communication quality by obstruction associated with each beam which is a connection destination candidate (transition destination), and performs control operations such that the user terminal excludes a beam(s), which involves a risk of occurrence of decrease in communication quality due to obstruction, from the connection destination candidate(s).

Figure 14B:
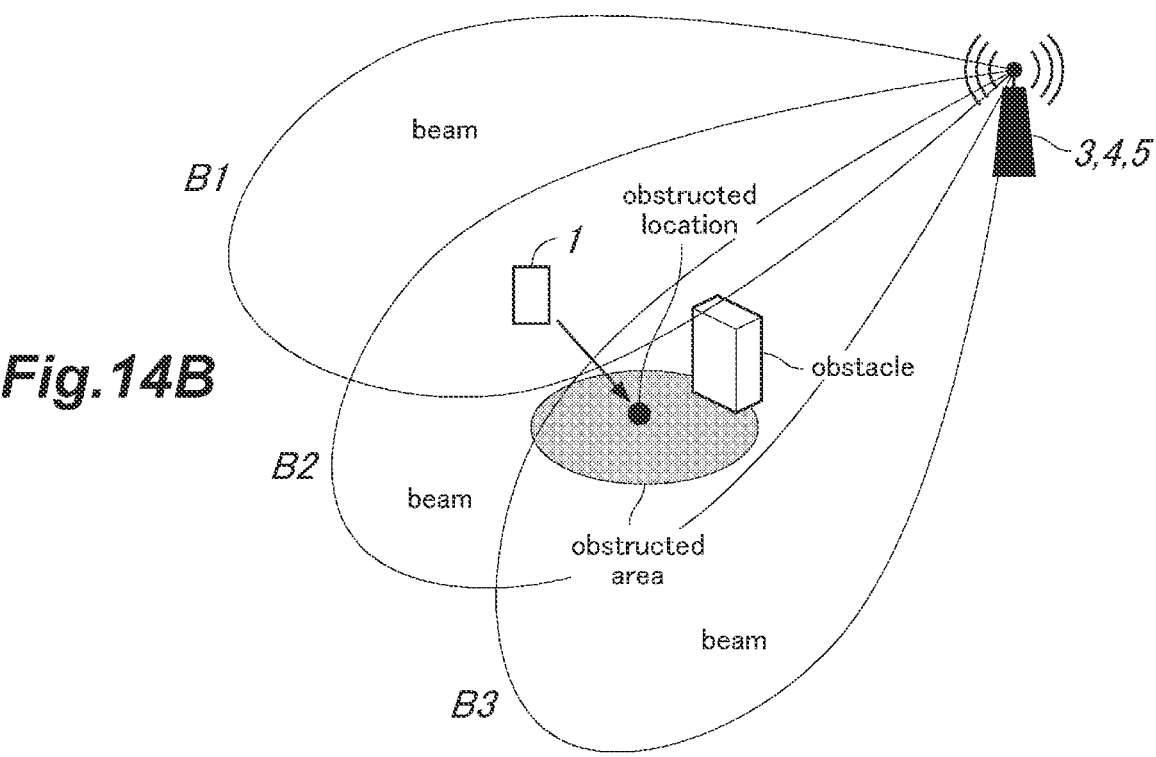

In an example shown in FIG. 14B, when the user terminal 1 reaches a boundary of the currently-connected beam B1 and is located close to an obstructed location associated with the beam B2 adjacent to the beam B1, control operations are performed such that the user terminal excludes the beam B2, which involves a risk of occurrence of decrease in communication quality, from the connection destination candidate(s), and changes its connection destination to the safe beam B3 which does not involve such a risk of occurrence of decrease in communication quality.

In the present embodiment, the storage 34 stores information registered in the communication history database in the same manner as the first embodiment (See FIG. 4). In the present embodiment, the information registered in the communication history database includes information on each beam (such as beam ID) and other related information.

In the present embodiment, the user terminal performs beam control in such a manner as to control a beam used as its connection destination. However, the user terminal may be configured to perform this beam control in combination with the cell control in the previous embodiments in combination.

Fourth Embodiment

Next, a fourth embodiment of the present invention will be described. Except for what will be discussed here, this embodiment is the same as the above-described embodiments.

In the first embodiment, the user terminal 1 is configured to perform a connection destination control such that, when the user terminal 1 comes close to an obstructed location and into a risky state in which decrease in communication quality is expected to occur, the user terminal 1 prospectively changes its connection destination to a different safer connection destination. However, in the present embodiment, the user terminal 1 is configured such that, when the user terminal 1 comes into a risky state in which rapid reduction in an amount of available communication bandwidth is expected to occur, the user terminal 1 lowers a current transmission rate for communicating data to a proper transmission rate. Since the user terminal reduces an amount of available communication bandwidth used for transmitting data in advance of reduction in an actual amount of available communication bandwidth, this configuration can prevent a packet stay in the network after reduction in an actual amount of available communication bandwidth, thereby keeping the video from stopping.

Moreover, in the present embodiment, the user terminal is configured such that a transmission rate at each location acquired during past communication is registered in the communication history database as historical communication information, and to acquire, based on the historical communication information, an expected transmission rate at an expected location at which the user terminal is expected to be located after a lapse of a predetermined time period, and communicates data at the expected transmission rate.

Furthermore, in the present embodiment, the user terminal determines a degree of risk of occurrence of reduction in an amount of available communication bandwidth beyond a tolerance limit, based on whether or not a rate difference between a current transmission and an expected transmission rate is greater than a predetermined threshold value.

Figure 15:
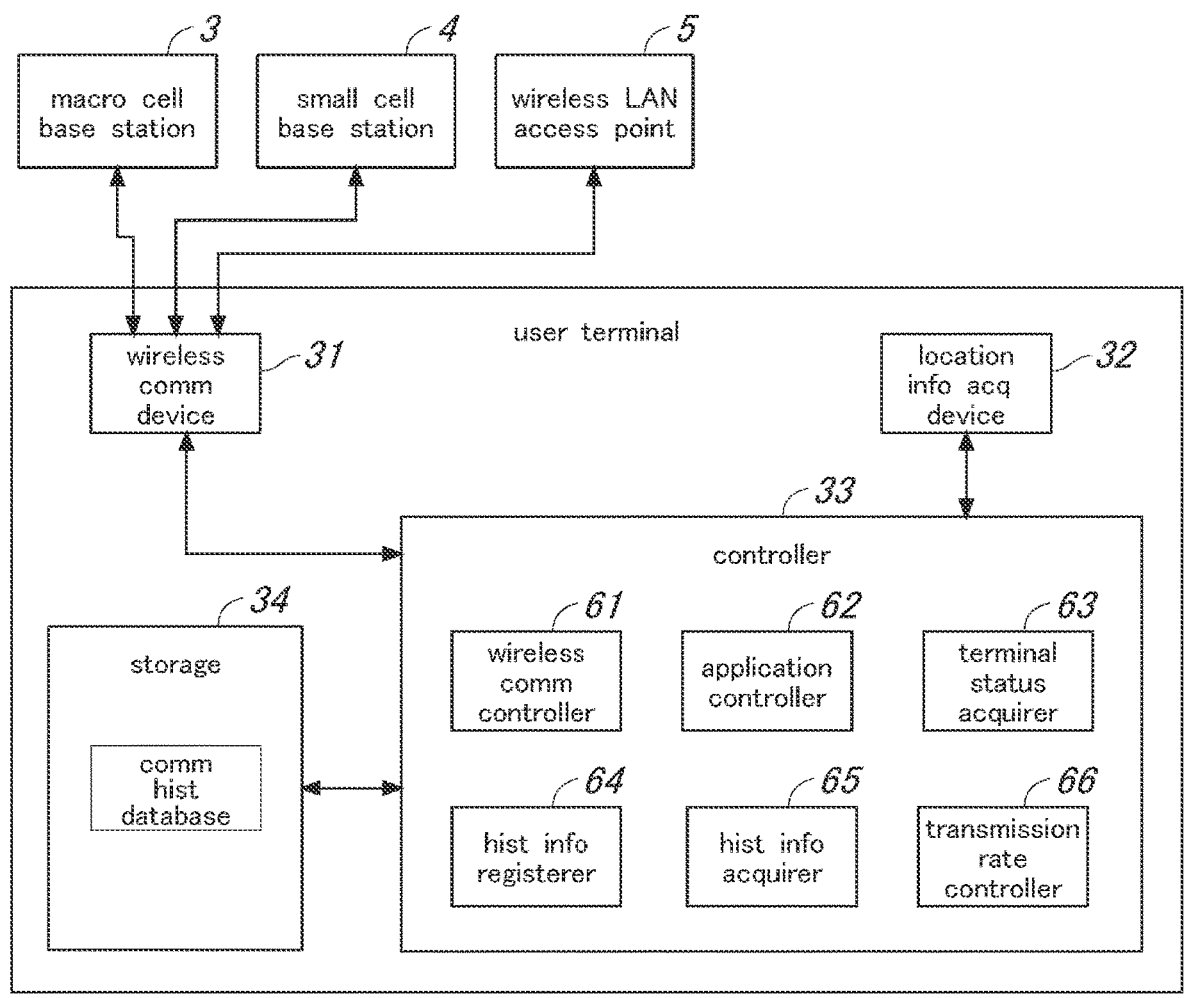
FIG. 15 is a block diagram showing a general configuration of a user terminal 1 according to a fourth embodiment of the present invention.

Next, a general configuration of a user terminal 1 according to the fourth embodiment of the present invention will be described. FIG. 15 is a block diagram showing a general configuration of the user terminal 1 according to the fourth embodiment. FIG. 16 is an explanatory view showing an example of historical communication information registered in a communication history database according to the fourth embodiment.

The user terminal 1 includes a wireless communication device 31, a location information acquisition device 32, a controller 33, and a storage 34 as in the first embodiment (See FIG. 4).

The storage 34 stores information registered in the communication history database. Items of the historical communication information in the communication history database (See FIG. 16) includes date, time, location, RAT, frequency, cell ID, beam identifier, moving direction, communication quality, rate of change in communication quality, greatest difference in communication quality between the current location and nearby locations, and RLF determination result, and further includes application information (app information), transmission rate, number of packet loss, and RTT.

The controller 33 includes a wireless communication controller 61, an application controller 62, a terminal status acquirer 63, a historical information registerer 64, a historical information acquirer 65, and a transmission rate controller 66.

The wireless communication controller 61 controls wireless communication performed by the wireless communication device 31, and selects a proper connection destination (macro cell base station 3, small cell base stations 4, wireless LAN access point 5) based on communication quality information or other relevant information.

The application controller 62 performs an operation(s) required for each application, and transmits and receives data to and from the server 2 via the wireless communication device 31.

The terminal status acquirer 63 acquires location information on a current location at which the user terminal is currently located and information on current moving status (moving velocity and moving direction) as terminal status information.

The historical information registerer 64 registers historical communication information on past communication status in the communication history database stored in the storage 34, where the historical communication information includes location information for each location in which communication was performed in the past, and other information on past communication status (such as connection destination, communication quality, and transmission rate).

In response to an inquiry transmitted from the transmission rate controller 66, the historical information acquirer 65 searches and acquires historical communication information for a specified location (expected location where the user terminal is expected to reach) in the communication history database stored in the storage 34. In some cases, the historical information acquirer 65 may be configured to acquire historical communication information on past communications involving a certain communication quality level or higher (a certain packet loss rate or higher, a certain transmission delay level or lower) selected from historical communication information including the same application information for a specified location (expected location). The historical information acquirer 65 may be configured such that, when finding two or more pieces of the historical communication information meeting such selection conditions, the historical information acquirer 65 selectively acquires a piece of historical communication information on the latest communication, or, alternatively, the historical information acquirer 65 selectively acquires a piece of historical communication information on a communication with the highest transmission rate. The latter selection condition is suitable for transmitting security surveillance video data, for example. In other cases, the historical information acquirer 65 is configured to notify the transmission rate controller 66 of averaged historical communication information obtained by averaging data seta in the historical communication information on past communications with rather high communication quality. This configuration is suitable for transmitting entertainment content video data.

In addition, the historical information acquirer 65 is configured such that, when failing to find historical communication information including any application information nor historical communication information including application information for an application currently used by the user terminal for communication, the historical information acquirer 65 acquires a piece of historical communication information obtained by selecting historical communication information on a communication with the highest transmission rate for the expected location, and then generating communication information corresponding to a virtual communication with a transmission rate lower than the highest transmission rate by a certain level.

The transmission rate controller 66 control a transmission rate for communicating data based on a current transmission rate and historical communication information acquired by the historical information acquirer 65. In the present embodiment, the user terminal determines a degree of risk of occurrence of rapid reduction in an amount of available communication bandwidth beyond a tolerance limit associated with an expected location at which the user terminal is expected to be located after a lapse of a predetermined time period, and the transmission rate controller 66 control a transmission rate for communicating the data based on a result of determination of the degree of risk.

More specifically, in the present embodiment, the historical information acquirer 65 acquires an expected transmission rate at the expected location based on the historical communication information, and communicates data at the expected transmission rate. Furthermore, the controller is configured to determine that there is a risk of occurrence of rapid reduction in an amount of available communication bandwidth beyond the tolerance limit when the expected transmission rate is lower than a current transmission rate by a rate difference which is greater than a predetermined threshold value.

Figure 18:
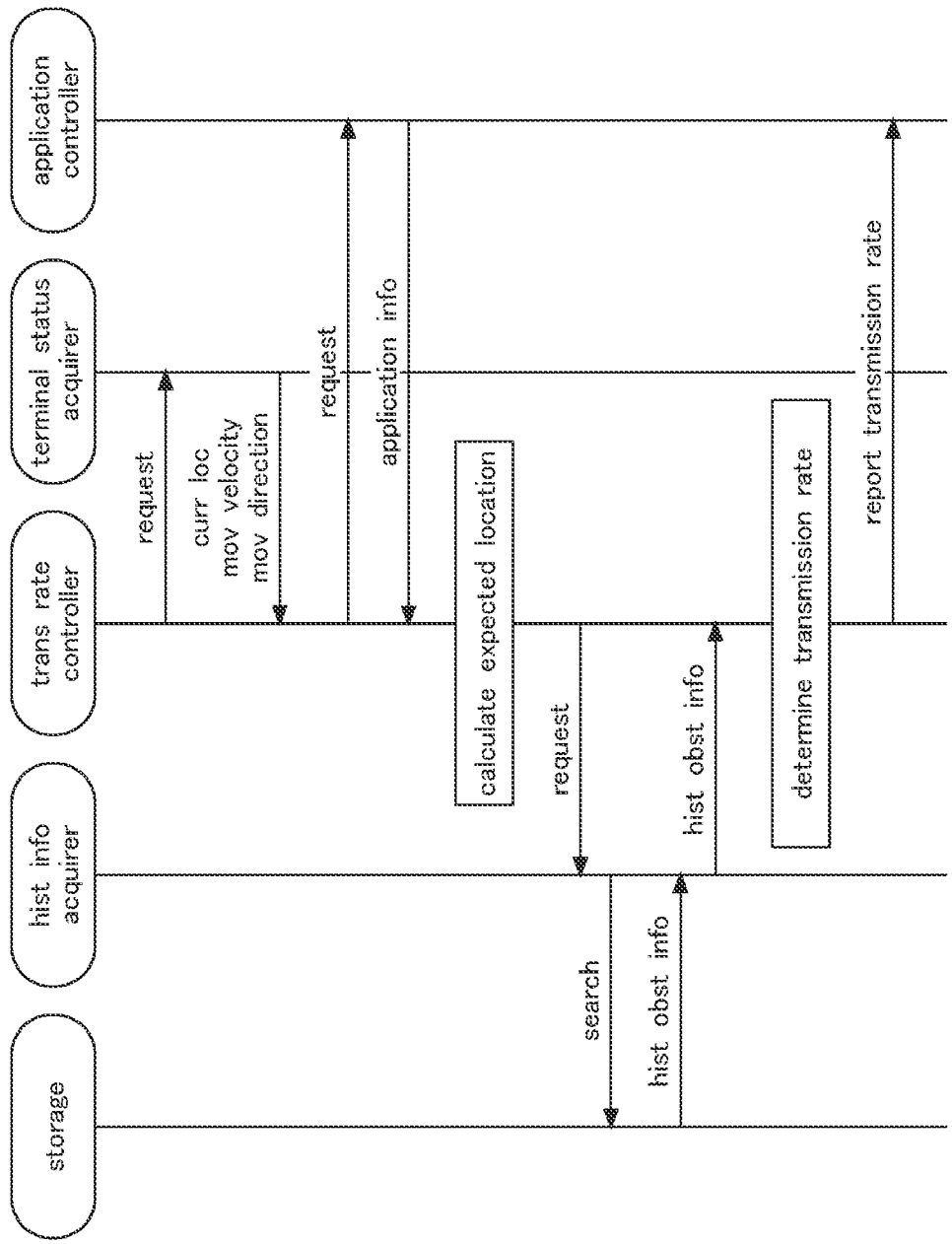
FIG. 18 is a sequence diagram showing an operation procedure of the user terminal 1 according to the fourth embodiment of the present invention.

Next, an operation procedure of the user terminal 1 according to the fourth embodiment will be described. FIG. 17 is a flowchart showing an operation procedure of the user terminal 1. FIG. 18 is a sequence diagram showing an operation procedure of the user terminal 1.

First, the transmission rate controller 66 acquires location information on a current location of the user terminal from the terminal status acquirer 63 (ST401). The transmission rate controller 66 also acquires a moving velocity and a moving direction of the user terminal from the terminal status acquirer 63 (ST402). Then, the transmission rate controller 66 acquires application information on an application currently performing communication from the application controller 62 (ST403).

Them, the terminal status acquirer 63 calculates an expected location at which the user terminal is expected to be located after a lapse of a predetermined time period based on the moving velocity and the moving direction of the user terminal. For example, the terminal status acquirer 63 calculates an expected location at which the user terminal is expected to be located in the predetermined time period (For example, 10 s)(ST404).

Next, the transmission rate controller 66 transmits an inquiry to the historical information acquirer 65 to check whether or not there is historical communication information for the expected location (ST405). In response, the historical information acquirer 65 searches for historical communication information including the same application information for the expected location in the communication history database stored in the storage 34, and if found, acquires the historical communication information.

If there is such historical communication information for the expected location (Yes in ST405), the transmission rate controller 66 acquires a transmission rate included in the historical communication information as an expected transmission rate at the expected location (ST406).

Next, the transmission rate controller 66 determines whether or not the expected transmission rate is lower than a current transmission rate by a rate difference which is greater than a predetermined threshold value (ST407).

If the expected transmission rate is lower than the current transmission rate by a rate difference which is greater than the predetermined threshold value (Yes in ST407), the transmission rate controller 66 notifies the application controller 62 of the expected transmission rate, whereby the application controller 62 adjusts the transmission rate used for transmitting data (video data) to the expected transmission rate (ST408).

If there is no historical communication information for the expected location (No in ST405) and/or if the expected transmission rate is lower than the current transmission rate by a rate difference which is not greater than the predetermined threshold value (No in ST407), the transmission rate controller 66 ends the operation without any further processing as there is not a risk of occurrence of reduction in an amount of available communication bandwidth beyond a tolerance limit. If the expected transmission rate is greater than the current transmission rate, it is preferable that the current transmission rate continues to be used because, when the transmission rate is increased in advance, a required communication bandwidth can exceed a current actual amount of available communication bandwidth.

Fifth Embodiment

Next, a fifth embodiment of the present invention will be described. Except for what will be discussed here, this embodiment is the same as the above-described embodiments.

In the fourth embodiment, the user terminal is configured such that a transmission rate for each location acquired during past communication is registered in the communication history database as historical communication information, and to acquire, based on the historical communication information, an expected transmission rate at an expected location at which the user terminal is expected to be located after a lapse of a predetermined time period, and communicates data at the expected transmission rate. However, in the present embodiment, a user terminal 1 is configured such that a connection destination for each location is registered in the communication history database as historical communication information, and to acquire, based on the historical communication information, a connection destination at the expected location, and communicates data at a transmission rate for the connection destination.

Furthermore, in the fourth embodiment, the user terminal is configured to determine a degree of risk of occurrence of reduction in an amount of available communication bandwidth beyond a tolerance limit, based on whether or not a rate difference between a current transmission and an expected transmission rate is greater than a predetermined threshold value. However, in the present embodiment, the user terminal is configured to determine the degree of risk based on whether or not a transmission capacity of an expected connection destination at the expected location is lower than that of a current connection destination. For example, in a case where the connection destination is changed from a 5G cell having a large transmission capacity of about 20 Gbps to an LTE cell having a small transmission capacity of about 300 Mbps, when both the cells are used by 100 users for communication, an amount of available communication bandwidth for each user is reduced from 200 Mbps in the 5G cell to 3 Mbps. In this way, in cases where an expected connection destination has a lower communication capacity than a current connection destination, a risk that the expected connection destination cannot accommodate the communication bandwidth currently used for communication, resulting in occurrence of a packet stay in the network, which leads to decrease in quality of video.

In the present embodiment, the storage 34 of the user terminal 1 stores information registered in a communication history database in the same manner as the fourth embodiment (See FIGS. 15 and 16). In the present embodiment, the information registered in the communication history database includes a connection destination for each location. The storage 34 also stores a transmission rate table (FIG. 19).

The transmission rate table according to a fifth embodiment of the present invention will be described. FIG. 19 is an explanatory view showing an example of the transmission rate table.

The transmission rate controller 66 of the user terminal 1 acquires a connection destination for an expected location at which the user terminal 1 is expected to be located in a certain time period, and communicates data with the connection destination at a transmission rate corresponding thereto. In the present embodiment, the transmission rate controller 66 acquires such a transmission rate for a connection destination for an expected location based on the transmission rate table (preset transmission rate information) stored in the storage 34.

Information registered in the transmission rate table includes transmission rates each for a corresponding RAT (Radio Access Technology) of a connection destination. In the example of FIG. 19, the table includes respective transmission rates for RATs; that is, LTE (Long Term Evolution), 802.11ac, and 802.11n (802.11ac and 802.11n are standards for wireless LANs established by IEEE. The Institute of Electrical and Electronics Engineers).

Next, an operation procedure of the user terminal 1 according to the fifth embodiment of the present invention will be described. FIG. 20 is a flowchart showing an operation procedure of the user terminal 1 according to the fifth embodiment.

The transmission rate controller 66 performs the processing operations from ST401 to STG105 in the same manner as the fourth embodiment (See FIG. 17). When the historical communication information does not include any application information nor application information for an application currently used by the user terminal 1 for communication, the historical information acquirer can acquire historical communication information for an expected location.

If there is such historical communication information for the expected location (Yes in ST405), the transmission rate controller 66 acquires a connection destination included in the historical communication information as an expected connection destination for the expected location (ST411).

Next, the transmission rate controller 66 compares a communication capacity of the expected connection destination with that of the current connection destination to thereby determine whether or not the communication capacity of the expected connection destination is lower than that of the current connection destination (ST412).

If the communication capacity of the expected connection destination is lower than that of the current connection destination (Yes in ST412), the transmission rate controller 66 acquires a transmission rate for the expected connection destination based on the transmission rate table as an expected transmission rate (ST413).

Next, the transmission rate controller 66 notifies the application controller 62 of the expected transmission rate, whereby the application controller 62 adjusts the transmission rate used for transmitting data (video data) to the expected transmission rate (ST408).

If there is no historical communication information for the expected location (No in ST405) and/or if the communication capacity of the expected connection destination is not lower than that of the current connection destination (No in ST412), the transmission rate controller 66 ends the operation without any further processing. If the communication capacity of the expected connection destination is greater than that of the current connection destination, it is preferable that the current transmission rate continues to be used because, when the transmission rate is increased in advance, a required communication bandwidth can exceed a current actual amount of available communication bandwidth.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, in the above-described embodiments, a user terminal is configured to accumulate historical obstruction information therefor and control a connection destination based on the historical obstruction information, or configured to accumulate historical communication information therefor and control a transmission rate based on the historical communication information. However, in other embodiments, a user terminal may be configured to upload historical obstruction information thereto and/or historical communication information thereon to a communication control device in the network, so that the user terminal can share the uploaded information with other user terminals via the network.

In addition, in the above-described embodiments, a user terminal is configured such that each user terminal itself performs control operations (such as determination of a degree of risk, selection of a connection destination and selection of a transmission rate) based on historical obstruction information and/or historical communication information. However, a communication control device in the network may be configured to perform all or part of the necessary control operations based on historical obstruction information and/or historical communication information uploaded thereto.

INDUSTRIAL APPLICABILITY

A communication device, a communication system, a connection destination control method, and a transmission rate control method according to the present invention achieve an effect of allowing for prospective avoidance of decrease in communication quality due to obstruction and/or rapid reduction in an amount of available communication bandwidth, thereby enabling users to avoid encountering significant reduction in Quality of Experience, and are useful as a communication device for communicating data via a base station used as a connection destination, a communication system in which a communication device communicates data via a base station used as a connection destination, a connection destination control method for controlling a connection destination for a communication device to communicate data via a base station used as the connection destination, and a transmission rate control method for controlling a transmission rate at which a communication device communicates data via a base station used as a connection destination.

Glossary 1 user terminal (communication device)
2 server
3 macro cell base station (base station device)
4 small cell base station (base station device)
5 access point (base station device)
31 wireless communication device
32 location information acquisition device
33 controller
34 storage

The invention claimed is:

1. A communication device for communicating data via a base station used as a connection destination, the communication device comprising:
 a wireless communication device configured to wirelessly communicate with the base station used as the connection destination;
 a location information acquisition device configured to acquire location information on a location of the communication device;
 a storage configured to store historical communication information on past communication status; and
 a controller configured to:
 determine a degree of risk of occurrence of reduction in an amount of available communication bandwidth beyond a tolerance limit based on the historical communication information and the location information, the degree of risk being determined for an expected location at which the communication device is expected to be located after a lapse of a predetermined time period; and
 control a transmission rate for communicating the data based on a result of determination of the degree of risk.

2. The communication device according to claim 1, wherein the storage configured to store a transmission rate and application information both for each location as historical communication information, and
  wherein the controller is configured to, based on the historical communication information, acquire application information on an application currently performing communication and an expected transmission rate at the expected location, and communicates the data at the expected transmission rate.

3. The communication device according to claim 2, wherein the controller is configured to determine that there is a risk of occurrence of decrease in communication quality due to obstruction when the expected transmission rate is lower than a current transmission rate by a rate difference which is greater than a predetermined threshold value.

4. The communication device according to claim 1, wherein the storage configured to store a connection destination for each location as historical communication information, and
  wherein the controller is configured to, based on the historical communication information, acquire an expected connection destination at the expected location, and communicate the data at a transmission rate for the expected connection destination.

5. The communication device according to claim 4, wherein the controller is configured to determine that there is a risk of occurrence of decrease in communication quality due to obstruction when a transmission capacity of the expected connection destination at the expected location is lower than that of a current connection destination.

6. A communication system in which a communication device communicates data via a base station used as a connection destination, wherein the communication device comprises:
  a wireless communication device configured to wirelessly communicate with the base station used as the connection destination;
  a location information acquisition device configured to acquire location information on a location of the communication device;
  a storage configured to store historical communication information on past communication status; and
  a controller configured to:
  determine a degree of risk of occurrence of reduction in an amount of available communication bandwidth beyond a tolerance limit based on the historical communication information and the location information, the degree of risk being determined for an expected location at which the communication device is expected to be located after a lapse of a predetermined time period; and
  control a transmission rate for communicating the data based on a result of determination of the degree of risk.

7. A transmission rate control method for controlling a transmission rate at which a communication device communicates data via a base station used as a connection destination, the method comprising:
  the communication device determine a degree of risk of occurrence of reduction in an amount of available communication bandwidth beyond a tolerance limit based on historical communication information on past communication status and location information on a location of the communication device, the degree of risk being determined for an expected location at which the communication device is expected to be located after a lapse of a predetermined time period; and
  the communication device controlling a transmission rate for communicating the data based on a result of determination of the degree of risk.

\* \* \* \* \*